INVENTOR.
WILLIAM P. HUNSDORF
BY
Oberlin & Limbach
ATTORNEYS.

Sept. 20, 1955     W. P. HUNSDORF     2,718,359
ARMATURE WINDING MACHINE
Filed Jan. 4, 1950     16 Sheets-Sheet 3

INVENTOR.
WILLIAM P. HUNSDORF
BY
Oberlin & Limbach
ATTORNEYS.

Sept. 20, 1955  W. P. HUNSDORF  2,718,359
ARMATURE WINDING MACHINE
Filed Jan. 4, 1950  16 Sheets-Sheet 5

INVENTOR.
WILLIAM P. HUNSDORF
BY
Oberlin + Limbach
ATTORNEYS.

Sept. 20, 1955  W. P. HUNSDORF  2,718,359
ARMATURE WINDING MACHINE
Filed Jan. 4, 1950  16 Sheets-Sheet 6

INVENTOR
WILLIAM P. HUNSDORF
BY Oberlin & Limbach ATTORNEYS.

Sept. 20, 1955 W. P. HUNSDORF 2,718,359
ARMATURE WINDING MACHINE
Filed Jan. 4, 1950 16 Sheets-Sheet 7

INVENTOR.
WILLIAM P. HUNSDORF
BY
Oberlin & Limbach
ATTORNEYS.

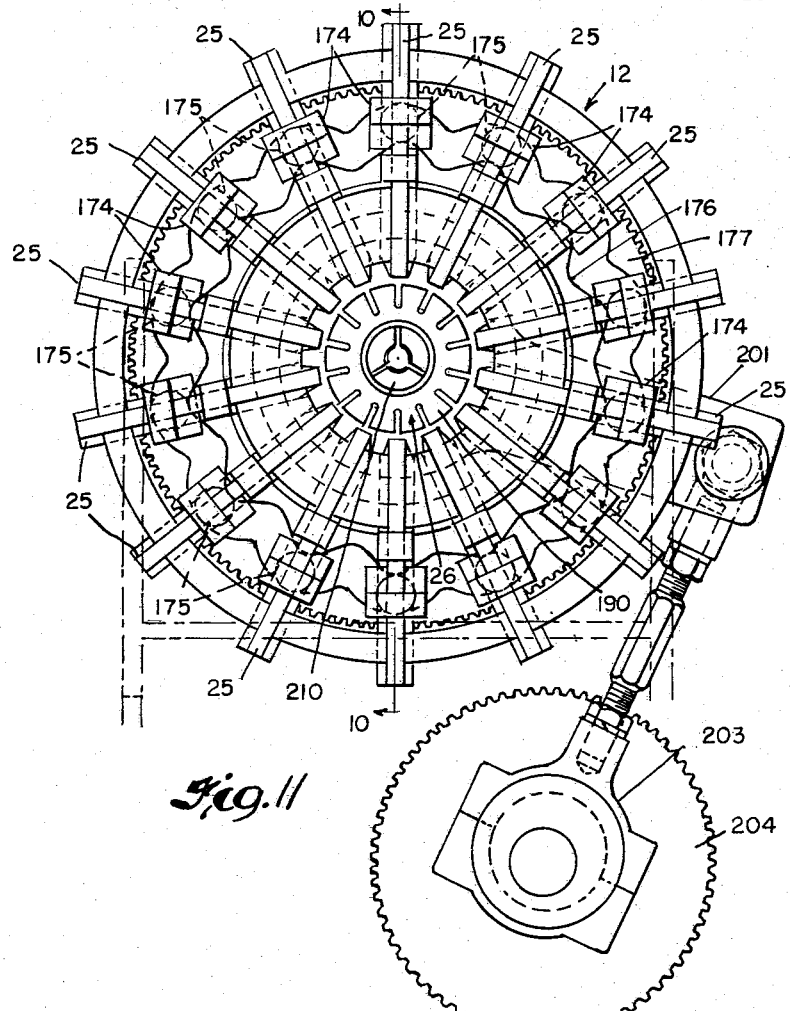
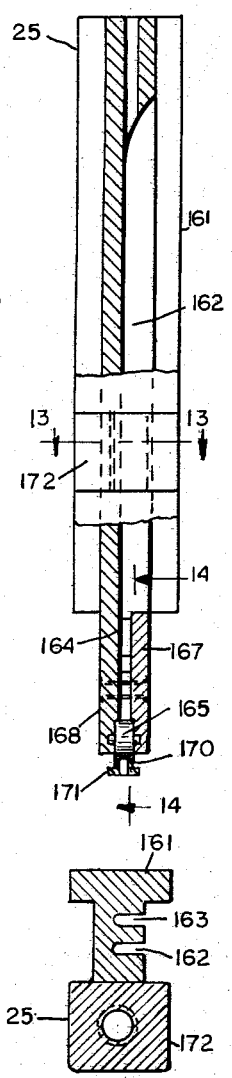
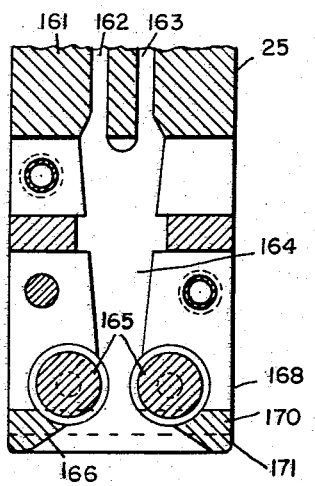
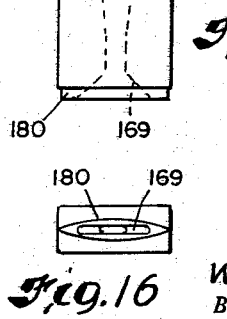
INVENTOR.
WILLIAM P. HUNSDORF
BY
Oberlin & Limbach
ATTORNEYS.

Sept. 20, 1955  W. P. HUNSDORF  2,718,359
ARMATURE WINDING MACHINE
Filed Jan. 4, 1950  16 Sheets-Sheet 9

INVENTOR.
WILLIAM P. HUNSDORF
BY
Oberlin & Limbach
ATTORNEYS.

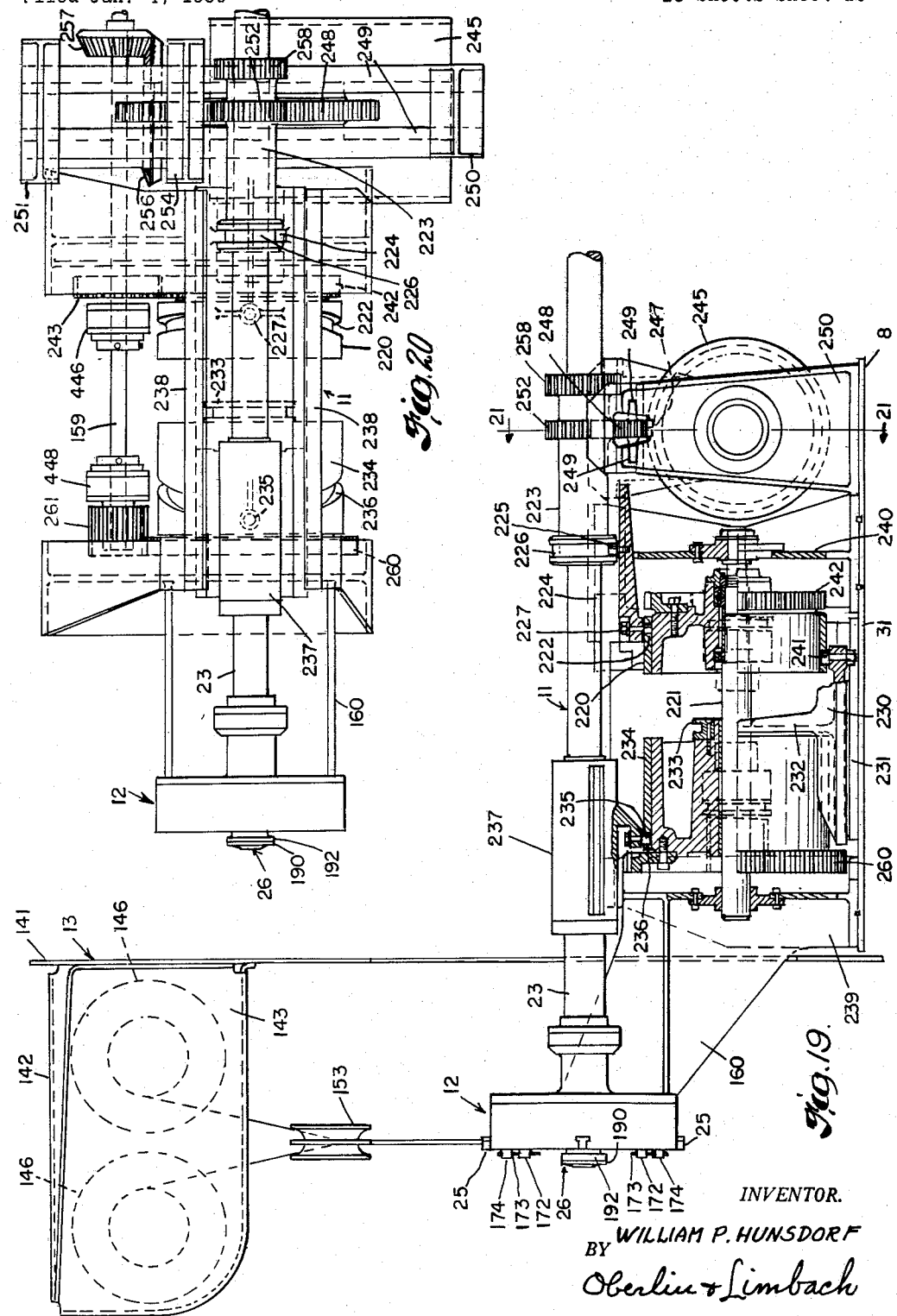

Sept. 20, 1955 W. P. HUNSDORF 2,718,359
ARMATURE WINDING MACHINE
Filed Jan. 4, 1950 16 Sheets-Sheet 11
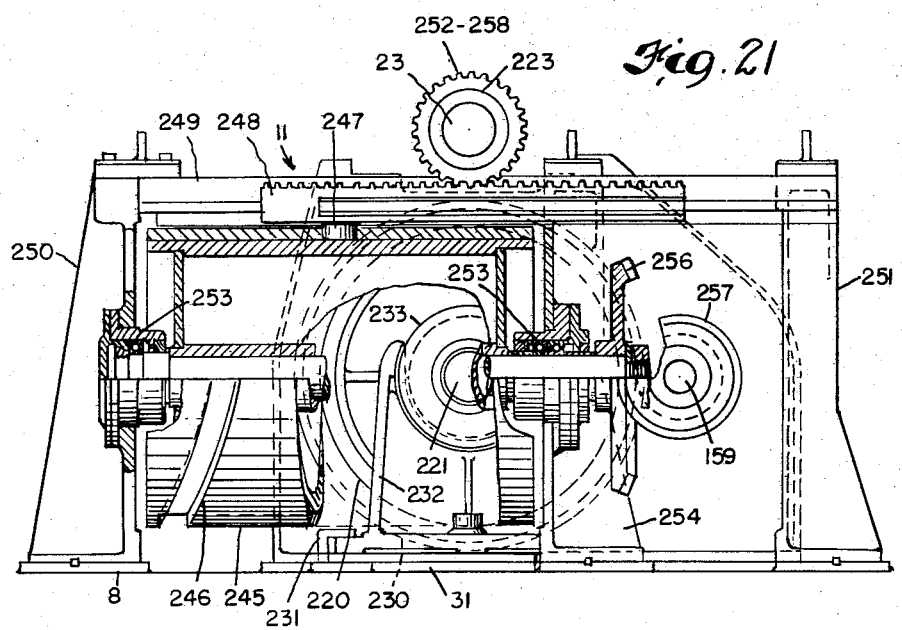
Fig. 21
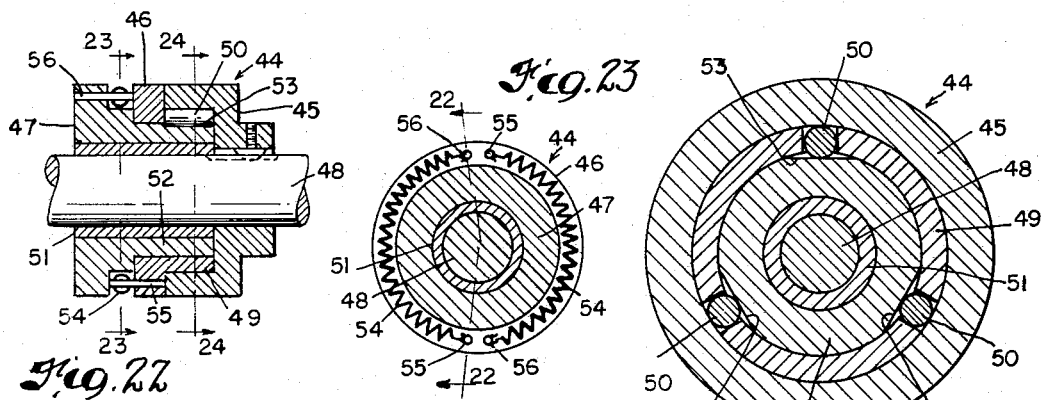
Fig. 22
Fig. 23
Fig. 24
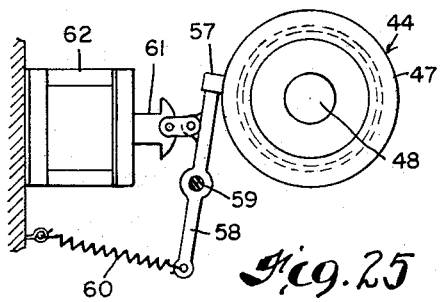
Fig. 25
INVENTOR.
WILLIAM P. HUNSDORF
BY
Oberlin + Limbach
ATTORNEYS.

Sept. 20, 1955 W. P. HUNSDORF 2,718,359
ARMATURE WINDING MACHINE
Filed Jan. 4, 1950 16 Sheets-Sheet 12

INVENTOR.
WILLIAM P. HUNSDORF
BY
Oberlin & Limbach
ATTORNEYS.

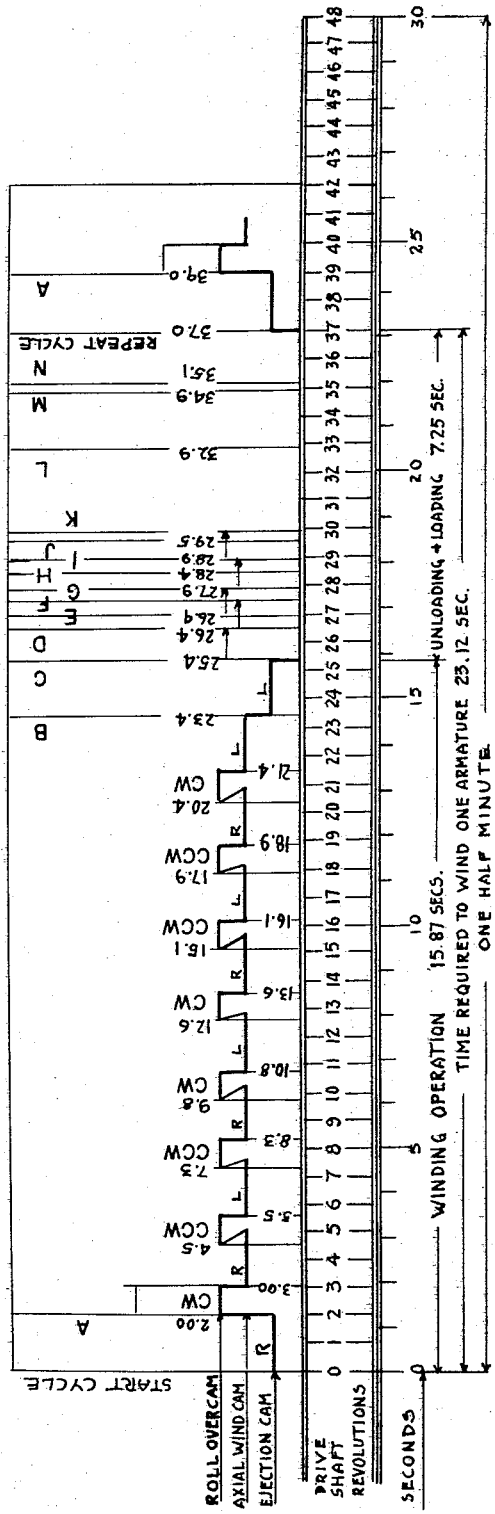
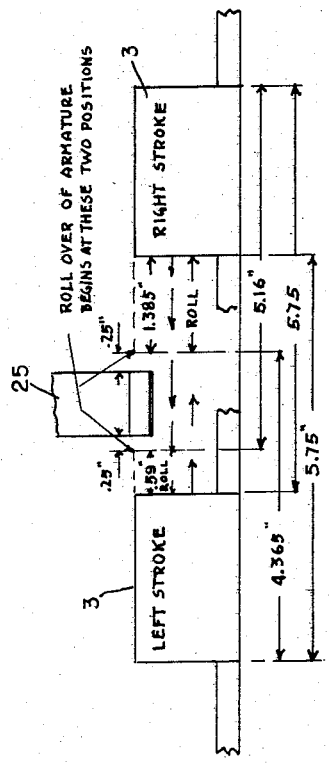

Sept. 20, 1955 W. P. HUNSDORF 2,718,359
ARMATURE WINDING MACHINE
Filed Jan. 4, 1950 16 Sheets-Sheet 15

INVENTOR.
WILLIAM P. HUNSDORF
BY
Oberlin & Limbach
ATTORNEYS.

Sept. 20, 1955  W. P. HUNSDORF  2,718,359
ARMATURE WINDING MACHINE
Filed Jan. 4, 1950  16 Sheets-Sheet 16

INVENTOR.
WILLIAM P. HUNSDORF
BY
Oberlin & Limbach
ATTORNEYS.

United States Patent Office 2,718,359
Patented Sept. 20, 1955

2,718,359

ARMATURE WINDING MACHINE

William P. Hunsdorf, Cleveland, Ohio, assignor, by mesne assignments, to Cleveland Electrical Equipment Co., Inc., Cleveland, Ohio, a corporation of Ohio Application January 4, 1950, Serial No. 136,767

18 Claims. (Cl. 242—13)

The present invention while relating generally as indicated to an armature winding machine and method is also concerned with the wound armature and relates more particularly to certain improvements over the armatures, machines, and methods with which my prior Patent No. 2,381,750, dated August 7, 1945, and copending application Serial No. 737,006, filed March 25, 1947, now Patent No. 2,632,603, are concerned.

Among the primary objects of this invention are to provide an improved armature in which all of the coils are tightly and uniformly wound with the end loops interwoven and interlaced to secure a perfect symmetry thereof and thereby to resist the tendency of the armature to breathe or expand under the influence of centrifugal force and further in which all of the coils are of equal length whereby to reduce sparking at the commutator to a minimum and to achieve static and dynamic balance.

A further object is to provide an improved machine and method by means of which armature cores may be automatically and rapidly wound without handwork to produce superior armatures as aforesaid and with which machine and method synthetic resin coated wire may be employed without danger of baring, chipping, scraping, or otherwise damaging the resin coated insulation from the wires incident to the winding operations.

Another object of this invention is to provide an improved machine in which the several components thereof are all of unique design contributing to overall foolproof and efficient construction and operation of the machine whereby armatures may be uniformly and rapidly wound.

Another object is to provide an armature and an armature winding machine and method in and by means of which the conductors of the armature coils are not only laid in diametrically opposed slots of the core but are in addition either arranged so that the end loops of successive turns of the coils are disposed on opposite sides of the armature shaft or so that the opposite ends or end loops of each turn of the coils are disposed on opposite sides of the armature shaft and successive turns of each coil have their end loops similarly disposed relative to the armature shaft but opposite from the disposition of such end loops of the next preceding turn, such winding further lacing and locking the conductor wires in place against centrifugal force and minimizing the build up of coil ends whereby to provide a compact end structure on the armature.

Another object is to provide an armature and an armature winding machine and method in and by means of which the conductors of the armature coils may be wound in any desired pattern to control end build-up of the coils and vary the shape of such ends and in some instances to shorten the lengths of the conductors and thereby reduce I²R losses.

Still another object of this invention is to provide an armature and an armature winding machine and method in and by means of which the interlaced and interwoven end loops of the armature afford ventilation for dissipation of heat generated in the armature during its use in a motor, generator, or the like.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail one illustrative embodiment of the invention, this being indicative, however, of but one of the various ways in which the principle of the invention may be employed.

In said annexed drawings:

Fig. 11 is an elevation view of the winding head as viewed along the line 11—11, Fig. 1;

Figs. 12–16 are views of various forms of wire feed fingers;

Fig. 19 is a side elevation view partly in cross-section of the axial winding, the ejection, and the roll-over mechanisms which are located at the rear portion of the machine or that portion of the machine at the right as illustrated in Fig. 1;

Fig. 20 is a top plan view of the portion of the machine illustrated in Fig. 19;

Fig. 21 is a cross-section view taken substantially along the line 21—21, Fig. 19;

Fig. 22 is a cross-section view of one form of roll clutch of which several are employed and through which power is transmitted from a main operating shaft to the several working components of the machine, said view having been taken along the line 22—22, Fig. 23;

Figure 26:
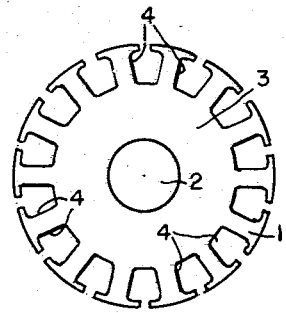
Figure 27:
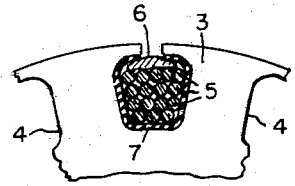
Figure 28:
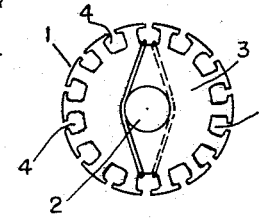
Figure 29:
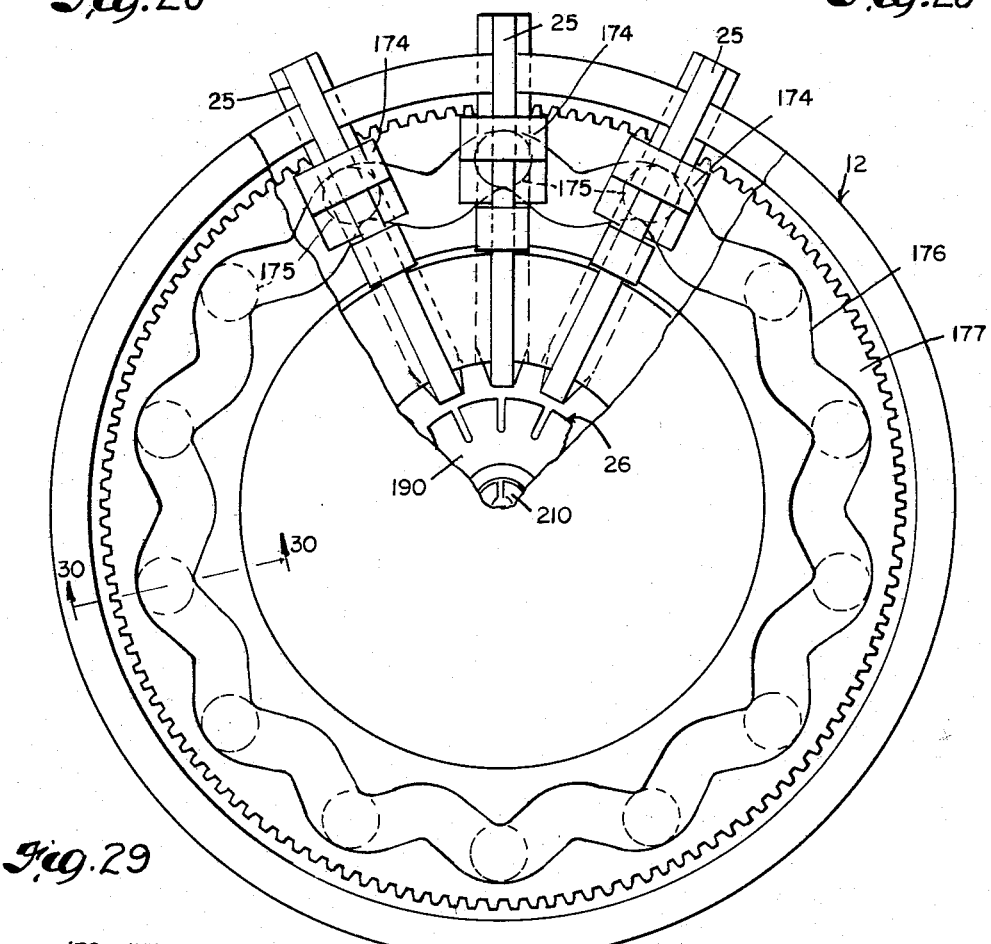
Figure 30:
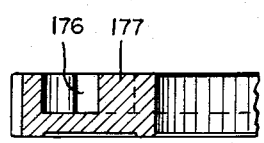
Figure 31:
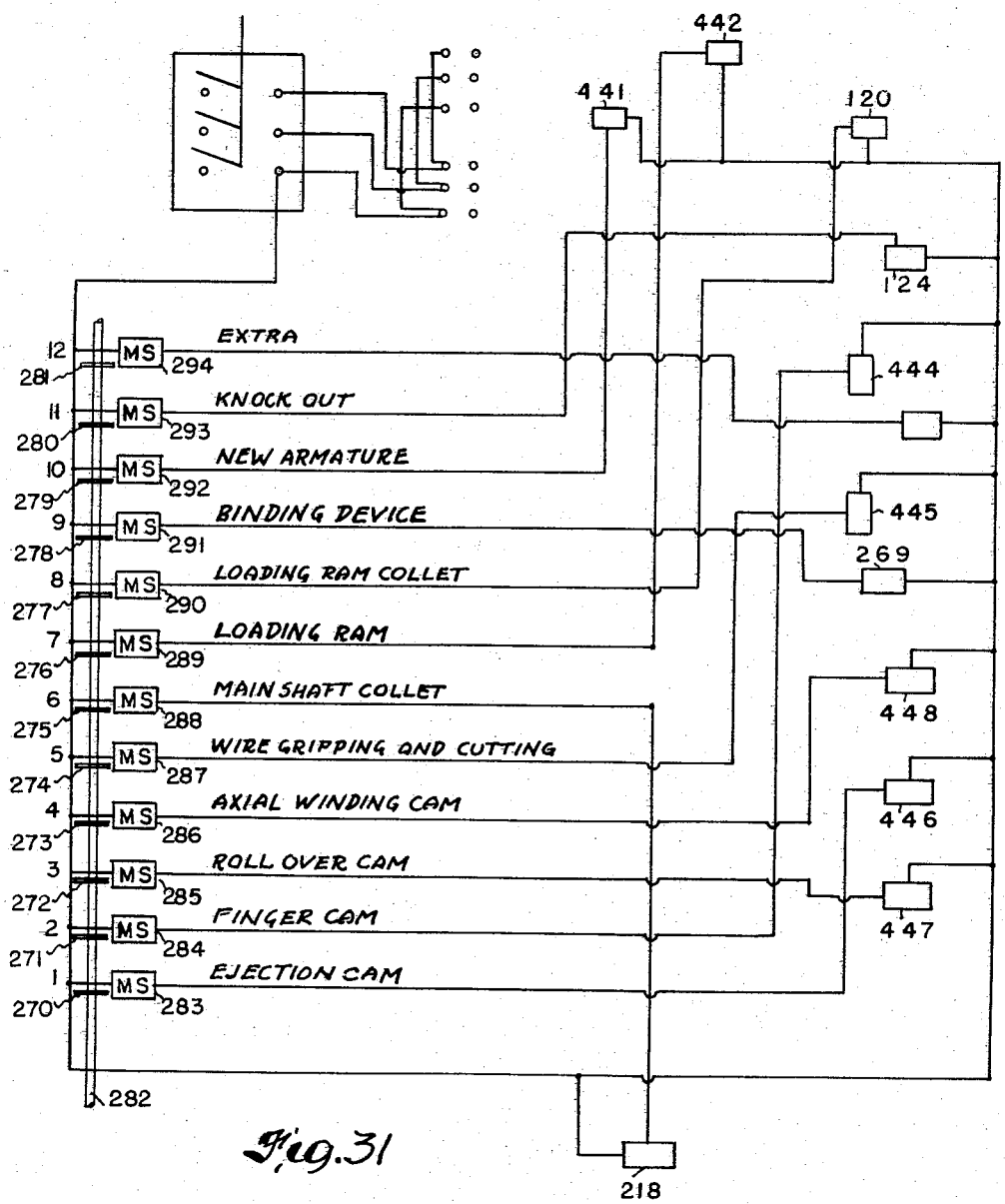
Figure 47:
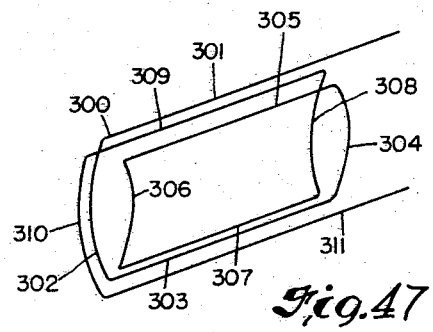
Figure 48:
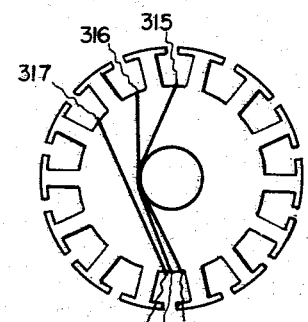
Figure 49:
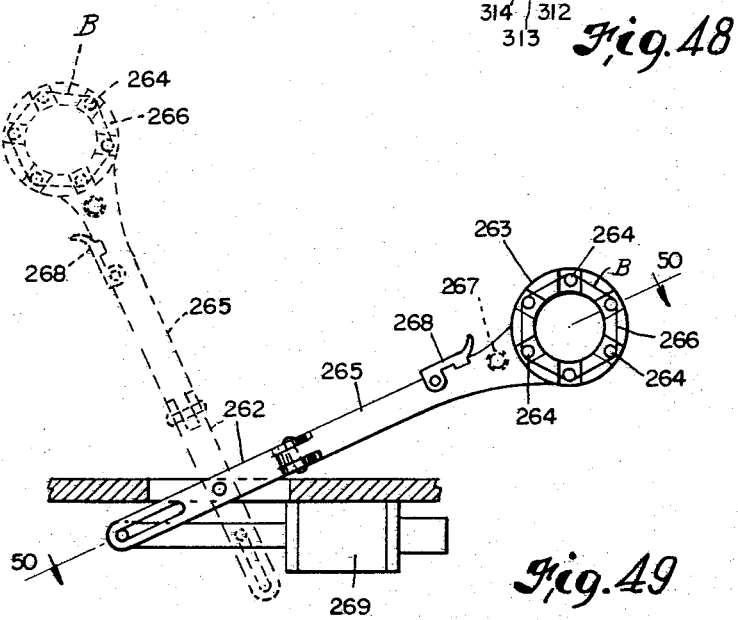
Figure 50:
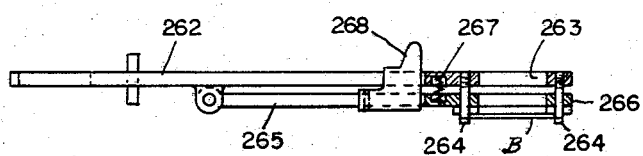

Figs. 23 and 24 are cross-section views taken along the lines 23—23 and 24—24 respectively, of Fig. 22;

Fig. 25 is an end elevation view of the roll clutch illustrating the solenoid-operated latch mechanism associated therewith;

Fig. 26 is an end elevation view of a typical armature core which is adapted to be wound with the machine and by the method constituting the present invention;

Fig. 27 is an enlarged view of one of the slots of the armature core illustrated in Fig. 26;

Fig. 28 is an end view of the armature core showing the manner in which it is preferred to wind the coils into the slots thereof Fig. 29 is a view similar to Fig. 11 except on a somewhat enlarged scale;

Fig. 30 is a cross-section view taken substantially along the line 30—30, Fig. 29;

Fig. 31 is a diagrammatic view of the timing control for the machine, illustrating the switches and solenoids employed;

Fig. 32 is a diagram of the timing and sequence of operations adapted to be performed by the machine during the winding of a typical armature;

Fig. 33 is a further diagram of the motions of the machine;

Figs. 34 through 46 illustrate the successive positions of the armature and parts of the machine during the winding operations;

Fig. 47 is a perspective view of a distributed vertical V wound coil;

Fig. 48 is an end view of an armature with a still different form of distributed winding;

Fig. 49 is a side elevation view of a binding device adapted to release a rubber band or the like around the wound armature to thus retain the windings in the slots; and Fig. 50 is a top plan view of the binding device.

For sake of illustration, the present invention is herein described with reference to the winding of a fourteen-slot armature core with four turns of two conductors of synthetic resin coated #15 copper wire as, for example, for generators and motors of automotive vehicles, and it will be apparent to those skilled in the art that the size and general construction of the armature core, the number of slots therein, the size of wire, the number of turns of the coils, the number of conductors, and the type of winding whether bi-polar or multi-polar and whether lap or wave wound, and other factors affecting armature design may be changed without essentially departing from the spirit of certain aspects of the invention. Moreover, while the slots in the armature core herein illustrated extend axially thereof, such slots may obviously be askew if desired and the machine modified accordingly.

By way of preliminary discussion, the armature core 1 is of any conventional form such as illustrated in Figs. 26–28 and 34–46 preferably comprising a shaft 2 with a laminated body 3 tightly fitted onto said shaft, said body being formed with slots 4 axially therethrough into which the wire coils 5 are adapted to be wound. As shown, the wires are held in place in the slots by suitable means such as the wedges 6 or the like. If desired, each slot 4 may be lined with an insulating member 7. As will hereinafter appear, all of the wire coils 5 are laid into the slots 4 simultaneously and each coil extends through one slot 4 and across one side of the shaft 2 through a diametrically opposed slot 4 and thence across the opposite side of the shaft back to the first slot (see Fig. 28) and successive turns of each coil extend similarly with the exception that the next succeeding coil has its end loops disposed on the opposite sides of the shaft whereby to effect balanced and compact winding. As will appear, the interweaving and interlacing of the coil ends and the simultaneous winding of all coils produces an armature having superior characteristics with regard to ventilation, dynamic and static balance, uniform length of coils to minimize sparking at the commutator, and reduction to a minimum of breathing of the coils due to the influence of centrifugal force.

Figure 1:
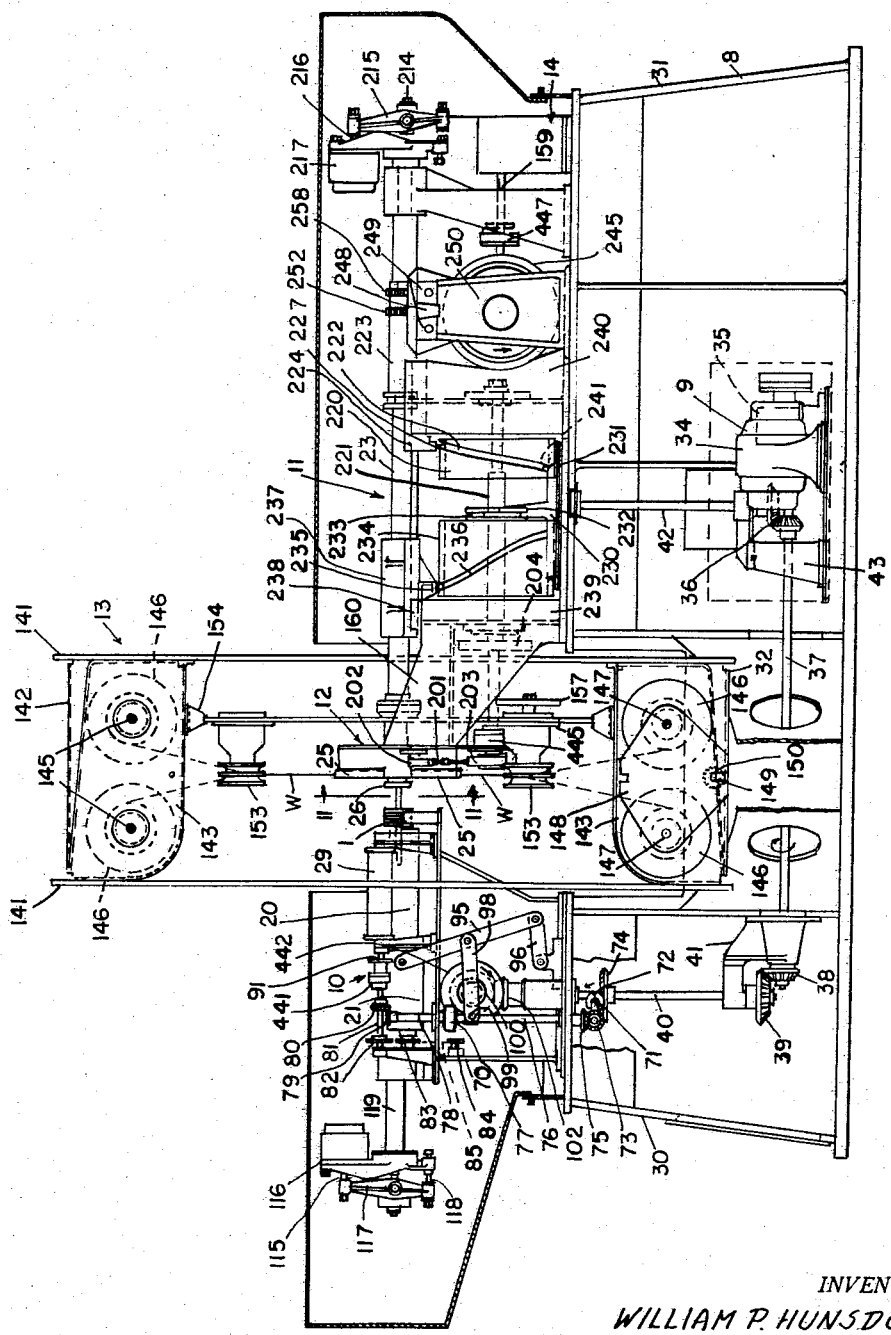
Fig. 1 is a side elevation view of one form of the machine.
Figure 2:
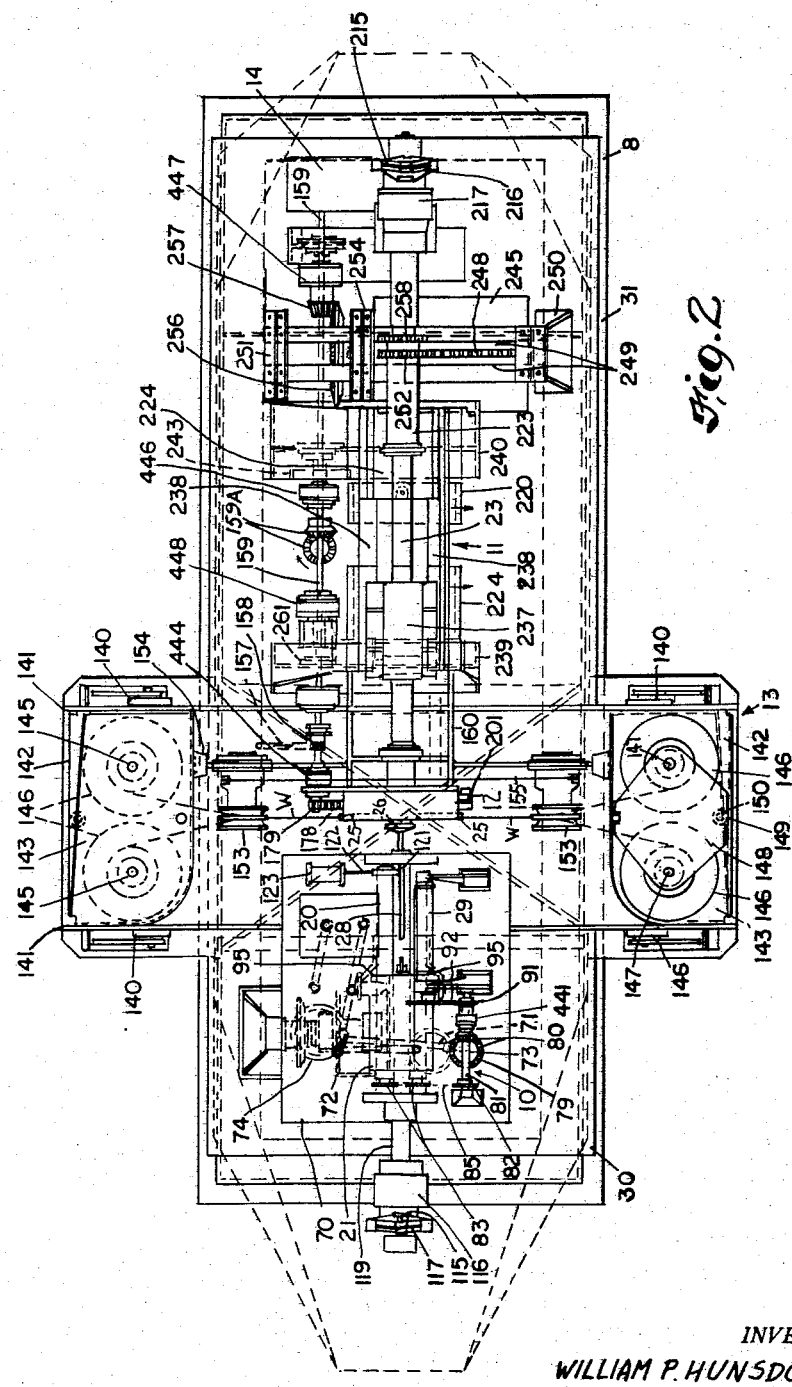
Fig. 2 is a top plan view of the machine illustrated in Fig. 1.
Figure 3:
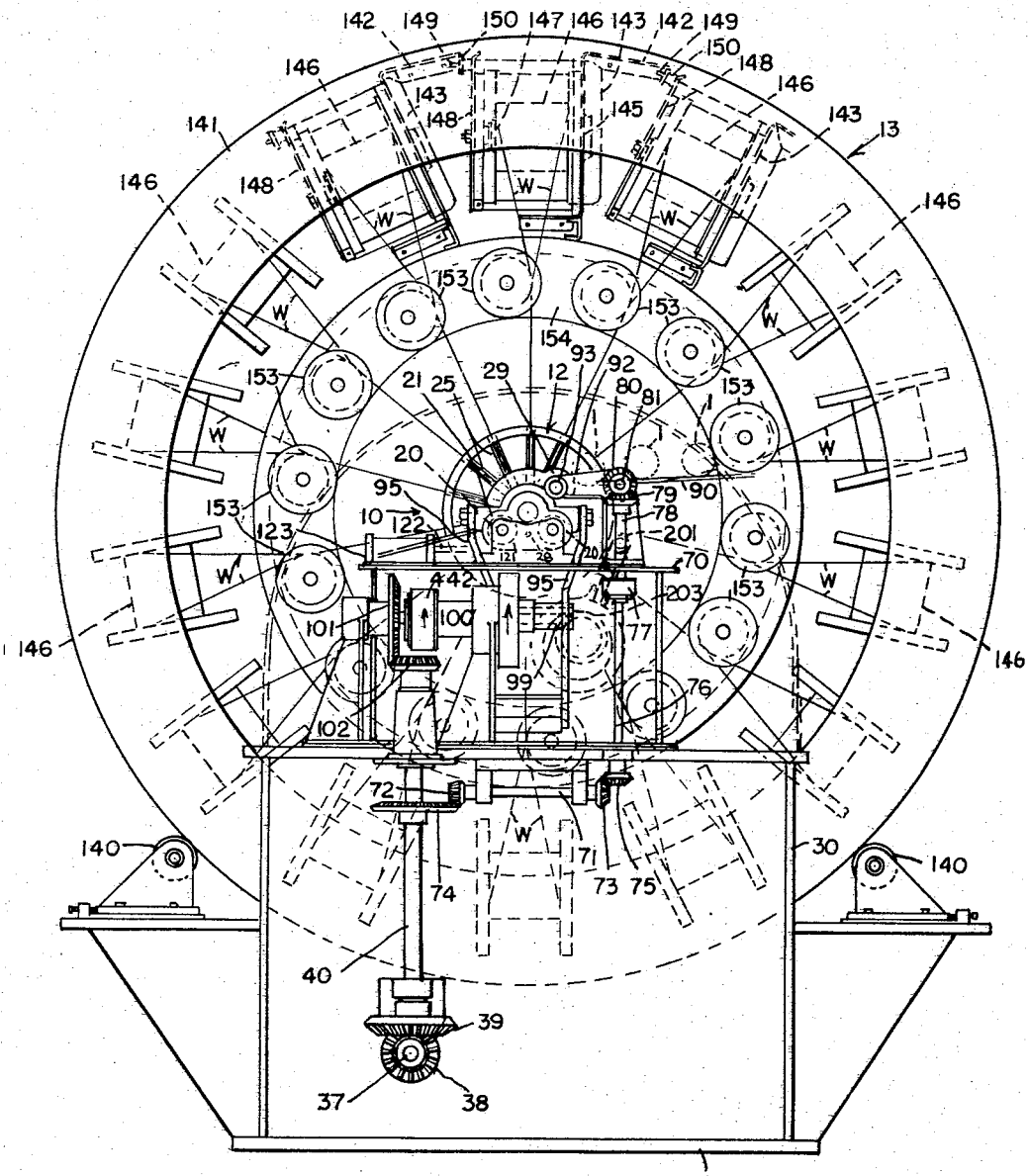
Fig. 3 is a front elevation view as viewed from the left-hand end of Fig. 1.

With the foregoing description of the preferred form of wound armature in mind, the apparatus for winding such armature as illustrated in the accompanying drawings, and particularly Figs. 1, 2 and 3, comprises a base 8 containing the power unit 9 therein through which some of the basic elements mounted on said base are adapted to be actuated. By way of introduction, some of the basic elements are the loading and unloading mechanism 10 located at the front end of the base, a wire gripping and cutting unit and associated winding and rollover mechanism 11 mounted on the rear end of the base, a winding head and feed finger assembly 12 mounted on said base between the loading and unloading mechanism 10 and the axial winding and roll-over mechanism 11, a series of wire supply reels and carrier 13 disposed around the feeding head, and a timing and sequence control device 14 for controlling the sequence and periods of operation of the aforesaid basic elements, said last-named device being preferably located on the rear portion of the base for ready access.

*Outline of winding steps (Figs. 34–46)*

Before proceeding with a detailed discussion of the construction and operation of the machine it has been deemed appropriate to enable a better understanding of the invention to now point out generally the sequence of operations from beginning to end and to indicate generally the relative movements of the machine parts and armature core during the winding of the latter, such sequence and movements being illustrated in Figs. 34 through 46.

Figure 34:
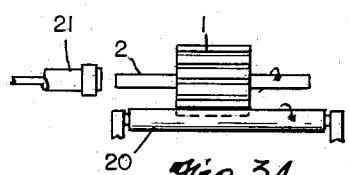
Figure 35:
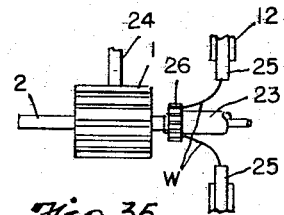
Figure 36:
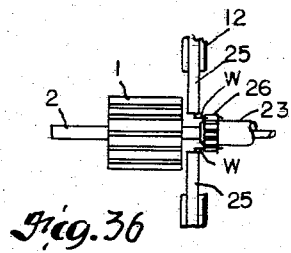
Figure 37:
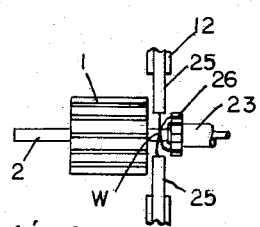
Figure 38:
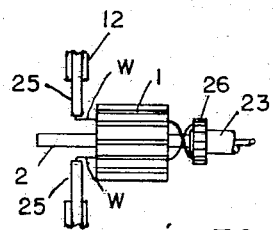
Figure 39:
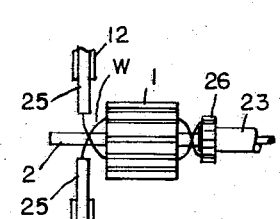
Figure 40:
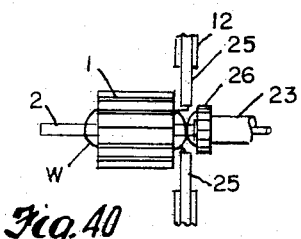
Figure 41:
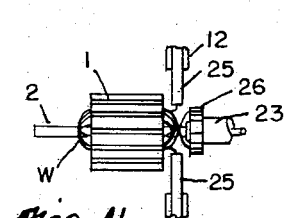
Figure 42:
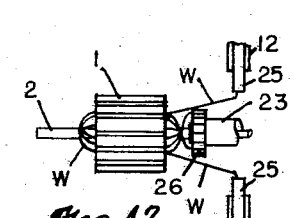
Figure 43:
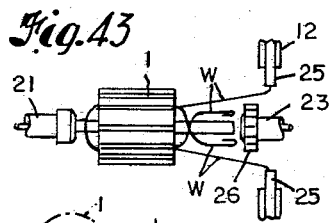
Figure 44:
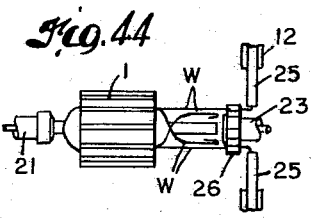
Figure 45:
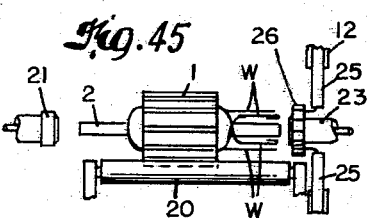

1. Place an armature 1 between parallel rotating rollers 20 to induce rotation of the armature about its longitudinal axis, as illustrated in Fig. 34;

2. Move a loading ram 21 toward the right to thereby push the armature toward the winding head 12 and into the collet of a main chuck shaft 23, as shown in Fig. 35. During such movement of the armature, the slot indicator 24 will enter one of the slots thereof to thereby arrest rotation and to position the slots in the armature in register with the wire feed fingers 25. With the armature thus positioned the loading ram is retracted to its starting position as illustrated in Fig. 34;

3. Close the collet onto the armature shaft 2 and retract the main shaft 23 to thus position the wire gripping and cutting head 26 to one side of the winding head 12 and the armature on the other side as illustrated in Fig. 36;

4. Move the feed finger 25 radially inward to meet the slots in the armature as shown in Fig. 36;

5. Rotate main shaft 23 180° to lace the wires W as shown in Fig. 37;

6. Move the main shaft 23 axially to draw the armature 1 through the winding head 12 as shown in Fig. 38 to thus cause the feed fingers 25 to run through the slots in the armature and lay the wires W into the armature slots;

7. Rotate main shaft 23 and armature 180° in the same direction as before to thus interlace and interweave the wires at the coil ends as shown in Fig. 39;

8. Move the main shaft 23 axially in an opposite direction to position the armature as shown in Fig. 40 in which the feed fingers have again moved through the slots of the armature core but this time through slots diametrically opposed to those traversed in step 6;

9. Repeat the preceding steps 5–8 except roll over 180° twice in opposite direction. Then repeat as often as required, alternately changing the direction of roll-over as indicated;

10. After the armature 1 has been completely wound the same will be in the position illustrated in Fig. 41, that is, the armature disposed on one side of the winding head 12 and the gripping and cutting unit 26 disposed on the opposite side of said winding head;

11. Move feed fingers 25 radially outward and move the main shaft to its home position as illustrated in Fig. 42;

12. Open wire cutting and gripping unit 26 and move loading ram 21 to forward position and grip armature shaft and draw core toward left as shown in Fig. 43 to withdraw the released wires W from the wire gripping and cutting unit;

13. Move feed fingers 25 radially inward to position the outer wires W in the wire cutting and gripping unit 26 as shown in Fig. 44;

14. Close the wire cutting and gripping unit 26 to cut the outer wires W and after such wires are cut drawing the wound armature to home position through the loading ram 21, the armature being released prior to the time that the loading ram reaches its home position as shown in Fig. 45. When the wires W are cut the same are at the same time gripped in the wire gripping and cutting unit 26 ready for starting of the winding of a succeeding armature;

15. Kick wound armature core 1 onto discharge chute 27 as by the ram actuated pin 28 shown in Fig. 46 and actuate the bucket 29 to place a new core (see Fig. 46), into the starting position between rolls 20.

The foregoing operations are then repeated, the machine including suitable timing and sequence control mechanism 14 as previously described so that no handwork whatever is required; and of course, once the machine has been set up, armatures can be continuously wound except during brief intervals while new wire supply reels are loaded onto the carrier 12 and the wires threaded through the feed fingers 25, and placed into the wire cutting and gripping unit 26, the latter then being shifted to closed position to grip the wires.

CONSTRUCTION AND OPERATION OF ELEMENTS OF MACHINE

*Base, power unit and roll clutch (Figs. 1, 2, and 3, and 22–25)*

The base 8 is preferably of hollow construction including a raised front end portion 30, a raised rear end portion 31, and a depressed intermediate portion 32. The power unit 9 is mounted within the rear end portion 31 or other convenient place and comprises as for example an electric drive motor 34 having a speed reducer unit 35 of any conventional form associated therewith, said reducer unit 35 being operatively connected as by bevel gearing 36 to a forwardly extending shaft 37 which has a bevel pinion 38 fixed at its forward end in mesh with a bevel gear 39 on a vertically disposed shaft 40. Said shaft 40 extends upwardly to the upper end of the base portion 30. The front and bottom ends of said shafts 37 and 40 are journalled as in an angle bracket 41 which is secured within said base 8. Also operatively connected to the reducer unit 35 by means of the gearing 36 is a vertically disposed shaft 42 extending upwardly and through the upper end of the base portion 31. The rear and bottom ends of said shafts 37 and 42 respectively are journalled in an angle bracket 43 which is mounted within base 8.

As will hereinafter appear, there are provided several clutches associated with the operating mechanisms or elements of the machine for selectively transmitting power from continuously rotating main shafts to the various mechanisms and elements and although said clutches may take on a variety of different forms, one familiar form is the roll clutch 44 which as illustrated in Figs. 22–25 comprises three sleeve-like sections 45, 46 and 47, said section 45 being keyed to a central drive shaft 48, said section 46 being provided with a slotted extension 49 fitted with rollers 50, and said section 47 being rotatable on bushing 51 on said shaft 48 and formed with an extension 52 fitting within the extension 49. Said extension 52 of section 47 has flats 53 formed thereon which operate as cams for actuating the rollers 50 for effecting driving of the section 47 through section 45 and the interposed rollers wedged therebetween. Said sections 46 and 47 have peripheral springs 54 therearound hooked over the pins 55 and 56 which extend axially from the respective sections, said springs being operative to tend to relatively rotate said sections and thereby effect wedging of the rollers 50 between said sections 45 and 47 whereby the latter section is driven by the former section.

Said section 47 is provided with one or more stop lugs 57 thereon adapted to be engaged by a latch 58 which is pivotally mounted as at 59 and normally urged to the position shown in Fig. 25 by means of a spring 60 so as to allow the shaft 48 of the clutch to rotate without effecting a driving of the section 47. Connected to said latch 58 is the armature 61 of a solenoid 62 and when said solenoid is energized said latch is withdrawn from engagement with lug 57 whereby said peripheral springs 54 effect relative rotation of sections 46 and 47 to thus lock the sections 45 and 47 together in driving relation through the rollers 50.

The number of full revolutions which the section 47 makes is determined by the length of time that the solenoid 62 remains energized and, of course, where it is necessary to control the rotation of section 47 in part-turn increments said section will have a plurality of lugs 57 thereon desirably spaced apart and in such case the solenoid 62 will be energized for only a short time period sufficient to permit one or more lugs 57 to pass the latch 58 and deenergized to allow the spring 60 to urge the latch to a position to be engaged by the next succeeding lug.

In the ensuing description, the several roll clutches will be identified by the numerals 441, 442 . . . to facilitate location thereof in the drawings.

*Armature loading and unloading mechanism (Figs. 1, 2, 3, 5, 6, and 7)*

This mechanism, identified generally by the numeral 10, comprises a support 70 attached on top of the base portion 30, said support having the opposite ends of parallel rollers 20 journalled therein. Rotation of said rollers is effected by means of a cross shaft 71 in base portion 30 having bevel gears 72 and 73 mounted on its opposite ends meshing respectively with a bevel gear 74 on the vertically disposed shaft 40 and a bevel gear 75 mounted on the lower end of a vertically disposed shaft 76. The upper end of shaft 76 is connected to a suitable coupling 77 and in turn the coupling is connected to a shaft 78 having a bevel gear 79 thereon in mesh with a bevel gear 80 keyed onto a shaft 81 which extends parallel to the rollers 20. Fixed on the end of said shaft 81 is a sprocket wheel 82 lying in the same plane as similar sprocket wheels 83 on the respective rollers 20 and an idler sprocket wheel 84. A sprocket chain 85 is trained over said sprocket wheels 82, 83 and 84 to effect driving of the rollers 20.

Mounted on one side and above the rollers 20 is an armature supply chute 90 preferably inclined slightly toward the rollers as best shown in Fig. 3 so that a series of armature cores 1 may be placed thereon ready for loading onto the machine for winding. At the discharge end of said chute 90 and also on such one side and above the rollers 20 is the bucket 29 of trough-like form disposed parallel to said rollers. As is apparent, periodic rotation of said bucket one full revolution will permit an armature core 1 to gravitate thereinto and thence be dropped onto the rollers 20, the next succeeding armature 1 in said chute 90 being held by the outside cylindrical face of said bucket. Periodic rotation of said bucket in one-revolution increments is effected by energization of the solenoid 62 (see Fig. 25) of the roll clutch 441 which has its drive section keyed to shaft 81 and its driven section provided with a sprocket wheel 91 over which is trained a sprocket chain 92, said chain being trained over a sprocket wheel 93 mounted at one end of said bucket 29.

Figure 4:
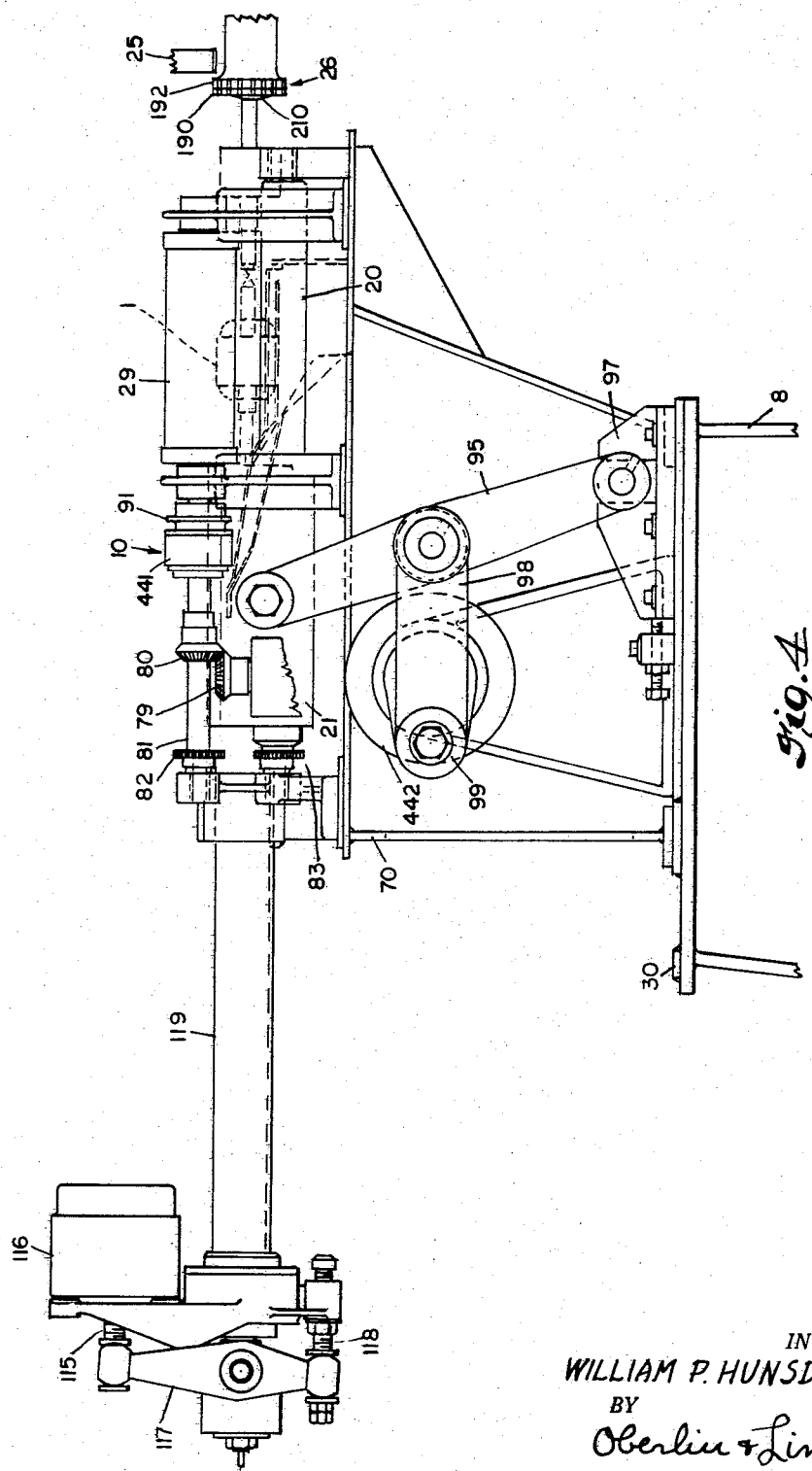
Fig. 4 is a side elevation view of the armature loading and unloading mechanism on a somewhat enlarged scale, said mechanism being located at the front portion of the machine or in other words the left-hand end as viewed in Fig. 1.
Figure 5:
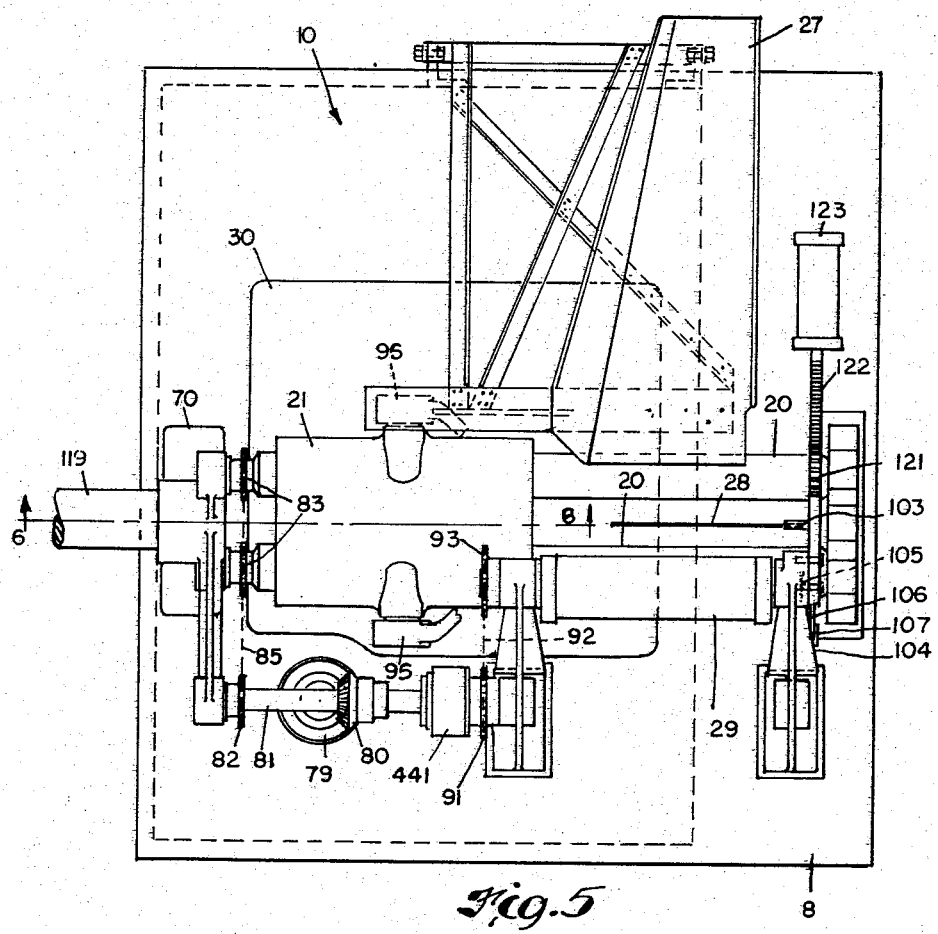
Fig. 5 is a top plan view of the armature loading and unloading mechanism.
Figure 7:
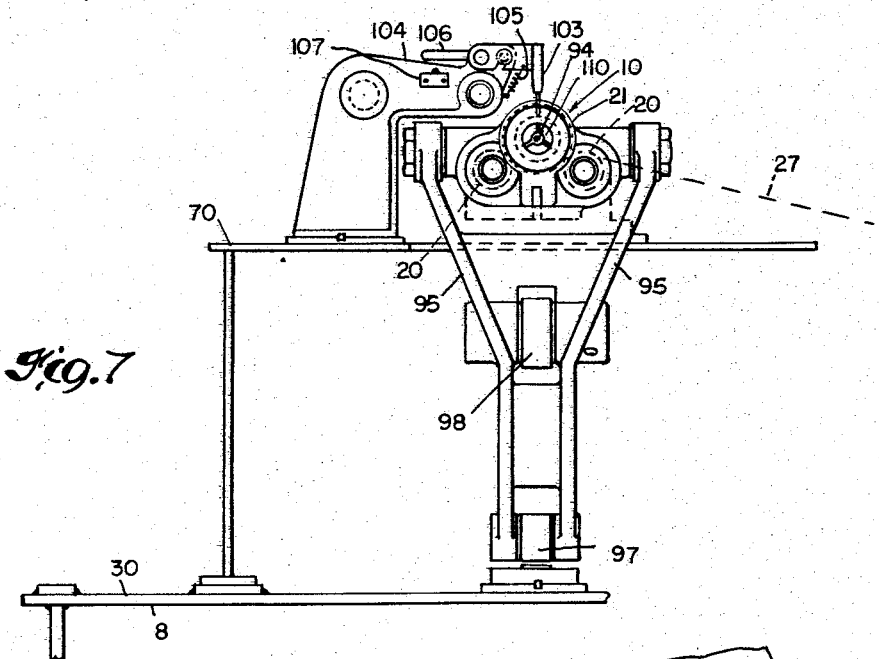
Fig. 7 is an end elevation view of the armature loading and unloading mechanism as viewed from the right-hand end of Fig. 4.
Figure 8:
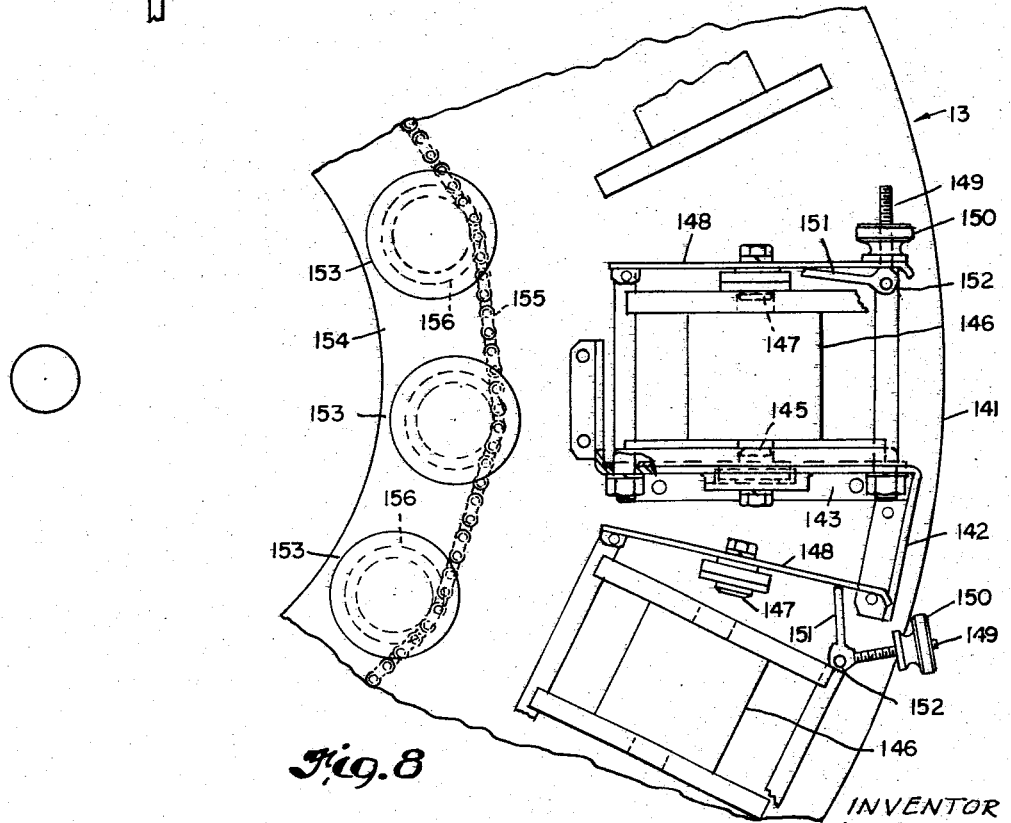
Figs. 8 and 9 are fragmentary views illustrating the supply reels for wire and the carriers for said reels.
Figure 9:
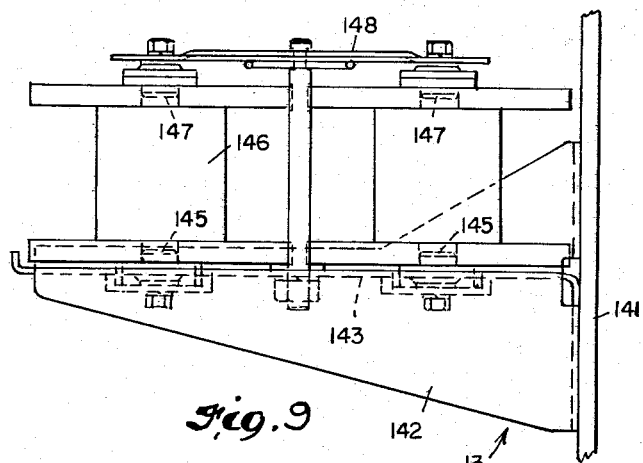

With an armature core 1 thus placed on the rotating rollers 20, the loading ram 21 is actuated to move the armature 1 toward the winding head 12. The loading ram 21 is slide-guided along the rollers 20 and a bar 94 is disposed in said ram fixed with respect to the base of the machine so as to eject armatures as wound upon retractive movement of the ram. The mechanism for reciprocating said ram 21 comprises a pair of links 95 having their upper ends pivotally connected to said ram and their lower ends pivotally connected to the base portion 30 of the machine through the intermediary of links 96 as shown in Figs. 1, 2 and 3 or optionally through the intermediary of a longitudinally adjustable block 97 as shown in Figs. 4 and 7. Intermediate portions of said links 95 are connected by a link 98 to a crank 99. Said crank 99 is attached to a cross shaft 100 connected to the driven section of another roll clutch 442. The drive section of said roll clutch 442 has a bevel gear 101 thereon in mesh with a bevel gear 102 fixed to the upper end of shaft 40. In this case the roll clutch 442, as best shown in Fig. 25, will be provided with two stop lugs 57 whereby the solenoid operated latch 58 will in one instance permit one full revolution of the crank 99 as when it is desired to shift an armature to winding position and return the ram 21 to home position and another stop lug 57 to permit first a major portion of one revolution of the crank 99 and partial retraction of a wound armature followed by rotation of the clutch and crank the remaining part revolution to retract the wound armature to starting position on the rollers 20.

As evident, the initial actuation of the loading ram 21 moves the armature 1, rotated by rollers 20, toward the winding head 12 and during such movement a slot indicator 103 (see Figs. 5 and 7 in particular) engages in one of the armature slots whereby to arrest rotation of the armature and position the same with its slots in register with the feed fingers 25 in said winding head 12. The underside of said slot indicator 103 is preferably inclined from opposite ends or rounded so that even though none of the armature slots may be initially engaged thereby, said indicator will climb onto the outside diameter of the armature and as soon as the armature rotates even a slight amount, said indicator will pop radially inwardly into one of the slots. Said indicator is pivotally mounted upon a support 104 and a spring 105 between said indicator and support tends to constantly urge the same radially inward to effect the desired popping in of said indicator as aforesaid.

Said indicator 103 is further provided with an extension 106 which is adapted to trip a switch 107 to open the main circuit through a holding relay and thus shut off the machine in the event that the indicator is raised an excessive amount as for example when an armature is not properly cradled or positioned on the rollers 20.

As indicated in step 12 of the foregoing outline of the operation of the machine, the loading ram 21 is adapted to grip the wound armature and draw the same forwardly of the machine away from the winding head 12 for ⅔ of its movement, to hold the armature at such partially retracted position until the wires W which lead to the feed fingers 25 are cut and finally to draw the armature still further forward and release the same on the rollers 20 prior to the ram reaching its home position.

Figure 6:
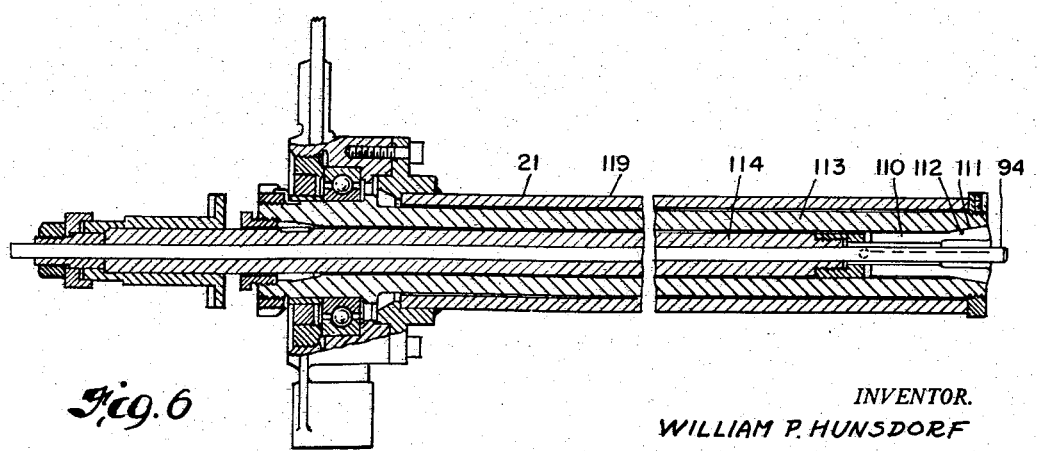
Fig. 6 is a cross-section view of the loading and unloading mechanism taken substantially along the line 6—6, Fig. 5.

The mechanism for gripping the armature shaft as aforesaid, as best shown in Fig. 6, comprises a contractible collet 110 of any conventional form provided with a cam surface 111 engaging in a similar cam surface 112 in a sleeve member 113, said cam surfaces being disposed so that relative axial movement of said sleeve and collet in one direction will effect contraction of the collet, and relative movement of said sleeve and collet in the opposite direction will permit expansion of the collet. The actuation of said collet is effected as by a draw bar 114 secured thereto at one end and having its other end extending beyond sleeve 113 and connected to the movable element 115 of a fluid power device 116, said movable element being a piston or diaphragm, for example, in a cylinder 116, through a link 117 having its upper end connected to said movable element and its lower end bearing against an adjustable abutment 118 of the cylinder and its intermediate portion connected to said draw bar 114. Said device 116 is mounted at the end of an extension 119 from ram 21, said extension being slidably keyed in support 70.

Actuation of said fluid power device 116 by air under pressure, for example, is controlled by a solenoid operated valve 120 (see Fig. 31) of familiar form which, when the solenoid therein is energized, opens to allow fluid under pressure to enter said fluid power device to close the collet 110 and when the solenoid is deenergized closes to vent the fluid under pressure or else allow the fluid under pressure to enter the other side of the fluid power device to open the collet.

Thus by energizing the solenoid valve 120 at the proper times, that is, at the end of the forward movement of the loading ram 21, it is possible to withdraw the wound armature away from the winding head 12. The partial withdrawal of the wound armature is, of course, controlled by the crank 99 and after the wires W which lead from the armature to feed fingers 25 have been cut it is desirable to further retract the armature and then open the collet 110 before the loading ram 21 reaches its home position. In this way the bar 94 will engage the end of the armature shaft whereby the wound armature 1 is left on the rotating rollers 20, ready for unloading from the machine into the discharge chute 27.

The lifting and lateral movement of the wound armature onto said discharge chute 27 (step 15 of outline of operation) is effected by the kick-out pin 28 which in inactive position extends axially between and below said rollers 20. Said kick-out pin 28 is carried at the end of an arm of a gear segment 121 which is rotatable about one of the rollers 20 and which meshes with a gear rack 122 formed on the piston rod of a piston reciprocable within a cylinder 123. Said piston and cylinder assembly will be periodically actuated to effect first a clockwise rotation of the gear segment, as viewed in Fig. 46, and then a counter-clockwise rotation as by a solenoid operated valve 124 of any familiar form operative when the solenoid thereof is energized to allow fluid under pressure to urge the piston to the left as viewed in Fig. 46 and when deenergized to allow fluid under pressure to shift the piston in an opposite direction to return the kick-out pin 28 to an inactive position.

*Wire supply reels and carrier (Figs. 1, 2, 3, 8, 9, and 19)*

This unit, identified by the numeral 13, is cradled in the base portion 32 and is rotatable thereon as on the rollers 140. Said unit comprises annular plates 141 supported on said rollers 140 and connected together in axially spaced relation as by a series of circumferentially spaced brackets 142 each of which brackets includes a generally radially disposed portion 143 having a pair of lateral projections or bearings 145 adapted to fit within one end of a pair of wire supply reels 146. A similar pair of projections or bearings 147 fits into the other end of the reels, said projections 147 being carried by plates 148 which are hinged at their inner edges to the respective brackets 142 to enable withdrawal of projections 147, whenever desired, to replace the reels 146. Swinging of plates 148 may be conveniently accomplished as by swing bolts 149 and nuts 150 thereon operative through a lateral arm 151 on each bolt upon loosening of the associated nut and swinging of the bolt to engage under said plate 148 and thereby lift the latter as shown in the lower portion of Fig. 8, each said bolt having a flat surface 152 thereon engaging the bracket to thus hold the bolt in such swung position and thereby free both hands of the operator for manipulation of the reels 146. As evident, each bracket and plate assembly carries two reels, fourteen such assemblies being provided in the present case to correspond with the number of slots in the armature to be wound with coils consisting of four turns of two conductors.

The wires W from said reels 146 are wrapped around capstans 153 which are carried on a ring 154 disposed within and attached to said brackets 142, there being one capstan 153 for each pair of reels 146 formed with two grooves for the respective wires W from said reels. Said capstans may be power-driven through a chain 155 trained over sprocket wheels 156 (see Fig. 8) on each capstan and by driving one capstan through a gear 157 meshing with a gear 158 (see Fig. 2) on a main drive shaft 159 driven from vertical shaft 42 by bevel gearing 159A effecting uniform driving of all of the capstans 153. By so driving the capstans 153 the wires W pass thereover and are drawn from the reels 146 and fed thereby to the winding head 12.

The cradling of this unit 13 on rollers 140 enables rotation thereof to facilitate unloading and loading of wire supply reels therefrom and thereonto. The reels 145 are preferably of relatively large size so as to require less frequent shut down of the machine and are preferably the same reels which are supplied by the wire manufacturer so as not to require any rewinding operations.

*Winding head and feed fingers (Figs. 1, 2, 3, 10–16, 19, 20, 29, and 30)*

The winding head 12 is annular in form and is carried at the end of a support 160 secured at the front end of base portion 31 so as to be disposed centrally within the reel carrier 13 and with a portion thereof lying in the same plane as the capstans 153.

Carried by said head 12 for radial reciprocation along paths tangent to the respective capstans are a corresponding number of feed fingers 25.

The form of feed finger 25 illustrated in detail in Figs. 12–14 comprises an elongated member 161 of T-shape cross-section provided with a pair of parallel passages 162 and 163 therethrough for the two wires W leading from the respective capstan 153, such passages leading to a common converging chamber 164 at which the two wires come together in side-by-side relation and run over the rollers 165 and issue from the narrow, smoothly flared opening 166 of width substantially equal to the diameter of the wire W. Such chamber 164 is defined between a block 167 bolted to the inner portion 168 of member 161. Said rollers 165 have their ends journalled in said block 167 and inner portion 168.

With this form of finger 25 the wires W may be of the type including a synthetic resin insulating coating thereover, polyvinyl acetyl for example having been found to possess desired properties, there being no tendency of scratching or chipping the coating incident to the drawing of wire through the fingers 25. In lieu of rollers 165 it has been found feasible in some instances to simply provide well rounded and smooth flared openings 169 in the fingers as shown in Figs. 15 and 16. In the case of the fingers 25 illustrated in Figs. 12–14, the lower end of each includes a neck portion 170 adapted to pass through the narrow portions of the armature slots and a flanged portion 171 adapted to pass through the wide portions of the armature slots. In some instances where the armature slots are filled with wires the flanged portion 171 of each finger will be omitted.

Each finger 25 also has a lug 172 thereon into which a bolt 173 (see Fig. 10) is adapted to be threaded, said bolt passing through a cam follower block 174 which has an opening therethrough of cross-section complementary with that of the member 161 and longitudinally slidable therealong. As apparent, said bolt 173 when turned is operative to adjust the radial position of the associated finger 25 in said winding head to accommodate different diameters of armatures.

Said cam block 174 has a cam follower roller 175 journalled thereon which fits into a cam groove 176 formed in a ring gear 177 rotatable within the winding head 12. Said ring gear 177 when rotated in part-turn increments will alternately move the fingers 25 in unison radially inward and outward with respect to the winding head 12 as is required during the winding operations.

Rotation of said ring gear 177 in such part-turn increments is achieved by providing an opening in one side of the winding head 12 to thus expose the teeth of said ring gear and by providing a gear 178 in mesh with said ring gear. The gear 178 is driven through a gear 179 on the main shaft 159 and is controlled by a solenoid-operated roll clutch 444 which, in this embodiment of the invention, is periodically operated in quarter-revolution increments to alternately move the fingers 25 radially inward and outward.

In winding armatures of the type in which the laminated body 3 is not keyed or otherwise non-rotatably secured to the armature shaft 2 there is a tendency to displace the end laminations during the roll-over operation whereby the slots 4 thereof become misaligned with the slots of intermediate laminations. In order to re-align the laminations after each roll-over operation some or all of the fingers 25 may be provided with extensions 180 (see Figs. 15 and 16) of relatively narrow and wedge-shape form adapted to engage the slots of the displaced laminations and restore them to initial aligned position upon relative axial movement of the armature and said fingers. Such re-aligning is of course done during each stroke of the armature in the winding head 12.

Figure 18A:
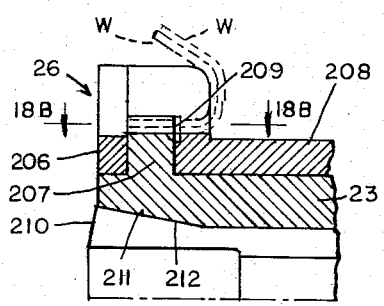
Fig. 18A is a cross-section view similar to Fig. 18 except illustrating a different form of wire gripping and cutting head.
Figure 18:
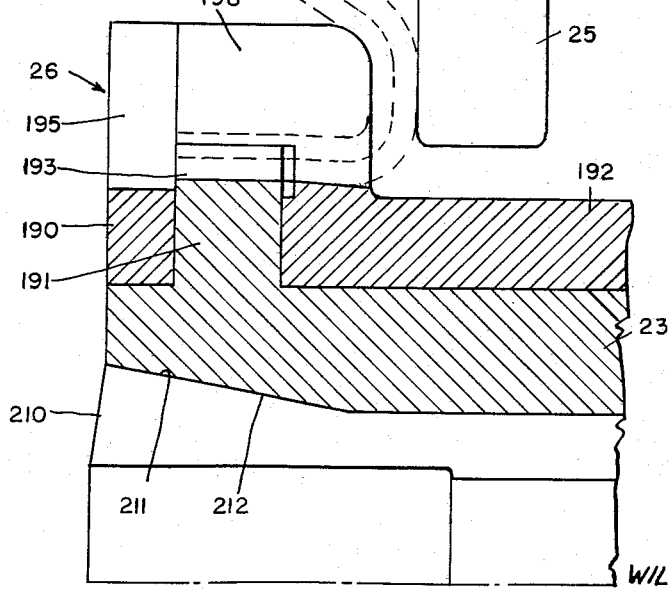
Fig. 18 is a cross-section view taken substantially along the line 18—18, Fig. 17.
Figure 18B:
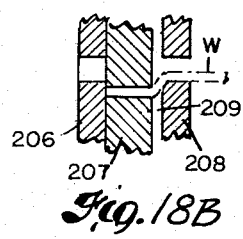
Fig. 18B is a cross-section view taken substantially along the line 18B—18B, Fig. 18A.

*Wire gripping and cutting unit (Figs. 1, 2, 4, 19, 20 and 29, and particularly 10, 11, 17 and 18) (also Figs. 18A and 18B illustrating a different form of unit)*

The wire gripping and cutting unit is identified generally by the numeral 26 in Figs. 35–45 and is disposed centrally within the winding head 12 and is carried on the main chuck shaft 23. Said unit 26 comprises, as most clearly illustrated in Figs. 10, 11, 17 and 18, three adjacent sections 190, 191 and 192 of which the section 191 comprises a flange adjacent the front end of the main chuck shaft. Said section 191 is formed with a plurality of radially disposed slots 193 which are aligned with the respective fingers 25, such slots being of width substantially equal to the diameter of the wires W and of radial extent slightly less than the dimension of two wires adapted to be positioned in side-by-side relation in such slots so that the top sides of the wires project radially beyond the outer diameter of said section 191.

The sections 190 and 192 are secured together by bolts 194 or the like, the section 190 being formed with radial slots 195 of which one side 196 of each is bevelled to provide sharp cutting edges 197. Thus it is apparent that rotation of section 190 in a counter-clockwise direction with respect to section 191 as viewed in Fig. 17 effects a cutting of all of the wires in the slots 193 in section 191.

The remaining section 192 is formed with a corresponding series of slots 198 adapted to receive the wires W and in addition such slots 198 are cut away or undercut as at 199 to provide cam surfaces 200 which upon rotation of the sections 190 and 192 as aforesaid with respect to section 191 serves to jam the wires radially inward so as to be firmly gripped in against the bottoms of the slots 193 of section 191.

Figure 17:
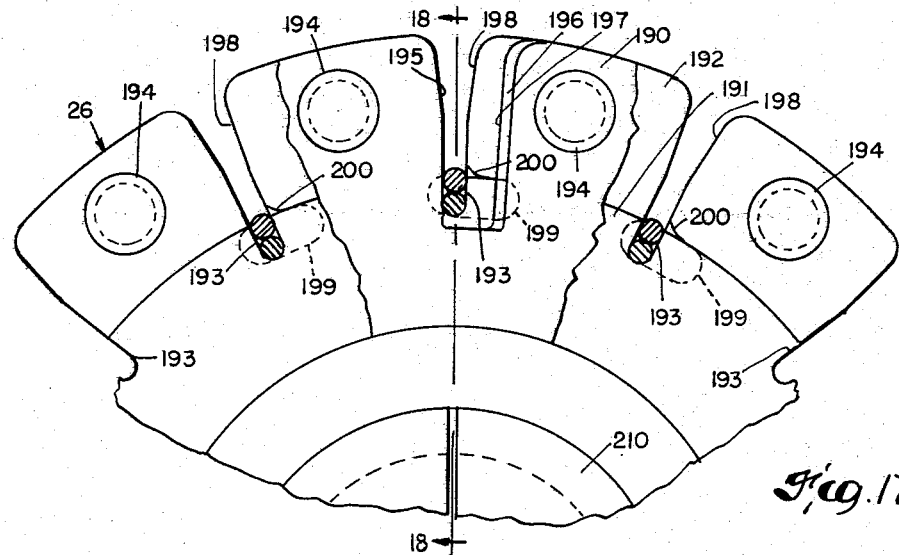
Fig. 17 is a fragmentary elevation view of the wire gripping and cutting head.

In Fig. 17 the cutting and gripping unit 26 is shown in open position with the slots of the sections 190, 191 and 192 in register or alignment. In the closed position of the unit the sections 190 and 192 will have been rotated counterclockwise relative to the section 191 whereby the wires W are cut by the cutting edges 197 of section 190 and the adjacent portions of the cut wires are gripped in section 191 by the cams 200 of section 192.

By reference to Figs. 35–45 it will be apparent from Fig. 35 that the wires W are gripped in this unit and extend rearwardly to the fingers 25 in generally conical form.

In the next position of this unit, as illustrated in Fig. 36, the main chuck shaft 23 has been shifted axially toward the rear of the machine and the fingers 25 have been moved radially inward, said fingers now being disposed between said unit 26 and the armature to be wound. The wires W thus make a reverse or U-bend and are disposed in the aligned slots 195 and 198 of sections 190 and 192. The wires W remain in this last-named position until the completion of the winding operation.

Upon completion of the winding operation the gripping and cutting unit 26 is opened to release the wires W whereupon the subsequent axial movement of the unit 26 and armature to the position of Fig. 43 withdraws the released wires W from said unit 26 which yet have the reverse bends thereon as shown.

The fingers 25 then move inward to place the uncut wires between the wound armature and feed fingers 25 into the unit 26 as in Fig. 44 whereupon closing of the unit will cut the wires W which lead to the wound armature so that the armature is now free to be discharged from the machine and will grip the wires which lead to the fingers 25 inbetween the sections 191 and 192.

Figure 10:
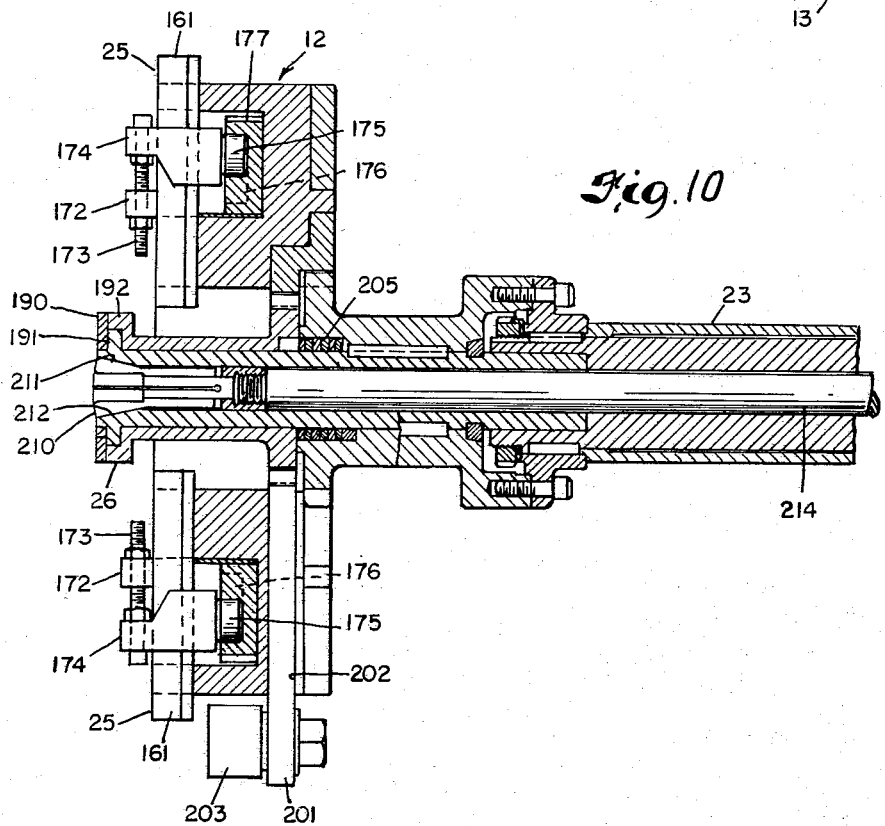
Fig. 10 is a cross-section view of the winding head and wire feed fingers therein taken substantially along the line 10—10, Fig. 11.

Opening and closing of the gripping and cutting unit 26 as aforesaid is effected by means of an oscillating lever 201 which, in the position of the main shaft 23 as illustrated in Fig. 10, is non-rotatably keyed to section 192, said section being relatively rotatable on the main shaft and thus relatively rotatable to the section 190. Said lever 201 extends through a circumferentially extending slot 202 in the winding head 12 and has its outer end connected to an eccentric 203 (see Fig. 11). Said eccentric 203 is so arranged that during one-half revolution thereof the unit 26 is opened and during the next one-half revolution the unit 26 is closed. The eccentric 203 is connected to the driven section of another roll clutch 445, the drive section being driven by a gear 204 of a gear train (not shown) starting on the main drive shaft 159. As before mentioned the solenoid-operated latch of said roll clutch 445 will control rotation of said eccentric 203 in one-half revolution steps as is required.

Suitable means such as the torsion spring 205 is provided to yieldably retain the unit 26 in a cutting or locked position during the axial and roll-over movements thereof with the main shaft 23.

The wire cutting and gripping unit illustrated in Figs. 18A and 18B and identified by the reference numeral 26, comprises sections 206, 207 and 208 corresponding generally with the sections 190, 191, and 192 respectively of the form of unit 26 illustrated in Figs. 17 and 18. One principal difference in the Figs. 18A and 18B form of unit is that gripping of the wires is effected by the provision of an annular recess 209 between sections 207 and 208 whereby the wires are bent and thus tightly gripped upon rotation of the sections 206 and 208 with respect to the intermediate section 207.

Although it is herein contemplated to cut the wires W to equal length and square, it will be apparent that in some instances it may be desired to modify the unit 26 to cut the wires to unequal lengths or to cut the wires so that the ends are beveled instead of square.

*Armature gripping, winding, and roll-over mechanism (Figs. 1, 2, 3, 10, 18, 19, 20 and 21)*

As previously indicated, the armature 1 to be wound is gripped in the main chuck shaft 23 and then the main chuck shaft is shifted axially to position the feed fingers 25 between the gripping and cutting unit 26 and the armature. The main chuck shaft 23, and thus the armature gripped thereby, is then rolled over 180° in one direction, shifted axially in one direction, that is the same direction as initially, rolled over 180° in the same direction as before, shifted axially in an opposite direction, rolled over 180° in an opposite direction, shifted axially in such one direction, and rolled over 180° in such opposite direction, such rolling over and axial shifting being continued for as many turns of the coils as required.

The mechanism for gripping the armature to be wound comprises a collet 210 of conventional form provided with a cam surface 211 engageable with a cooperating cam surface 212 in said main shaft 23, said cam surfaces being arranged to contract the collet 210 into gripping engagement with an armature shaft upon axial movement of the collet into the main chuck shaft 23, such movement of the collet being accomplished as by means of the draw bar 214 which is connected at its front end to said collet and at its rear end to a lever 215 similar to the lever 117 previously described. Said lever 215 in turn is connected by the movable element 216 to a solenoid-valve operated fluid power device 217 preferably of the same construction as the device 116 previously described. The valve for operating said device 217 is identified by the numeral 218 in Fig. 31 and is preferably of the same general construction as valve 120.

The initial axial movement of said main chuck shaft 23 to position the gripping and cutting unit 26 on one side of the plane of the feed fingers 25 and the armature on the other side of the plane of said fingers comprises an ejection cam drum 220 rotatably supported upon a shaft 221 and formed with a peripheral cam groove 222 which is disposed to move the shaft 23 first axially in one direction, that is toward the rear of the machine upon one-half revolution of said drum, and then in an opposite direction, that is toward the front of the machine upon another one-half revolution of said drum.

Shaft 23 has a hollow shaft 223 slidably keyed thereto but normally locked axially to render said hollow shaft axially movable as later explained in opposite directions on said shaft 23 through a slide member 224 having a roller 225 thereon engaged in a groove 226 of said shaft 223 and a roller 227 thereon engaged in such cam groove 222. Said parts 224, 225, and 227 are normally inactive or omitted and do not tend to reciprocate shaft 223 except as hereinafter described in connection with the cancelling device.

Shifting of the main chuck shaft 23 toward the right as viewed in Figs. 1, 2, 10, 18, 19, and 20 is effected through a slide member 230 which is slidable in a gib 231 and formed with a fork lever 232 engaged in a grooved collar 233 of an axial wind cam drum 234. Said drum 234 is slidable on said shaft 221 and has a cam groove 236 therearound in which the cam follower roller 235 is engaged. Said roller 235 is carried by a housing 237 having a rotatable but axially fixed connection with the main shaft 23. Said housing 237 is slide-guided on gibs 238 which extend longitudinally between spaced supports 239 and 240 secured on base portion 31. Said slide member 230 is actuated through a roller 241 thereon engaged in cam groove 222 of drum 220. Thus axial movement of the slide member 230 through rotation of the ejection cam drum 220 effects a corresponding axial movement of the axial wind can drum 234 and housing 237 and thus the main shaft 23.

The rotation of the ejection cam drum in one-half revolution increments is effected through a gear 242 thereon in mesh with a gear 243 on the main driving shaft 159, the ratio of the gears 242 and 243 preferably being 4:1 whereby periodic rotation of the smaller gear 243 two full revolutions as controlled by another solenoid-operated roll clutch 446 effects a one-half revolution turning of the ejection cam drum to first effect an axial shifting of the shaft 23 as indicated and then later, after the winding operation has been completed, an axial shifting of said shaft to initial position.

With the armature drawn to a position on one side of the plane of the feed fingers 25 and the gripping and cutting unit 26 on the opposite side, the next operation is to rotate the main shaft 23 and thus the armature 180° in a clockwise direction as viewed from the front of the winding head 12. This can be accomplished by means of a transversely disposed roll-over cam drum 245 which is formed with a peripheral cam groove 246 engaged by a roller 247 carried by a gear rack 248, said gear rack being slide-guided in transverse gibs 249 extending between supports 250 and 251. With the hollow shaft 223 in its normal axially locked position as aforesaid, the gear 252 thereon is in mesh with said rack 248 whereby rotation of the roll-over cam drum 245 one-quarter revolution will effect movement of the rack in one direction to rotate the gear 180° and thus rotate the hollow shaft 223 and main shaft 23 also 180°. Of course the rotation of the roll-over cam drum 245 another quarter revolution in the same direction will cause the rack to move further to rotate the main shaft 180° again in such one direction. Further rotation of said drum successively in quarter-revolution increments in the same direction will twice move the rack in opposite directions, each time rotating the main shaft 180° in an opposite direction.

Said roll-over cam drum 245 is journalled in bearings 253 in the supports 250 and 254 and has a bevel gear 256 fitted thereonto and engaged with a bevel pinion 257 on the main drive shaft 159. Again a solenoid-operated roll clutch 447 will be provided to periodically rotate the drum in quarter-revolution increments, the gearing preferably being such that one revolution of the driven section of the clutch and thus of the bevel pinion 257 rotates the drum one-quarter revolution.

At the end of the winding operation as hereinafter described in greater detail, the ejection cam drum 220 is rotated another one-half revolution to advance the main shaft 23 so that the gripping and cutting unit 26 is disposed forward of the plane of the feed fingers 25, gear 252 on shaft 223 being engaged with rack 248 to thus lock the shaft 23 against relative rotation whereby the gripping and cutting unit may be opened and closed by the operation of the ascillating lever 201 which is at this time keyed to the section 192 or 208 as the case may be.

The operation performed after each 180° roll-over of the main shaft 23 and the armature 1 gripped thereby is the laying of the wires W into diametrically opposed slots 4 in the armature 1, such being performed by reciprocating the main chuck shaft 23 and armature to thereby run the fingers 25 in one direction through the slots from one end of the armature to the other and then in an opposite direction through diametrically opposed slots and then back through the first traversed slots and so forth until the desired number of turns of coils are laid into the slots.

The reciprocation of the main shaft 23 and armature 1 between successive roll-overs thereof is effected by rotating the axial wind cam drum 234 in one-half revolution increments, the first one-half revolution thereof drawing the main chuck shaft rearward of the machine and the second one-half revolution shifting the main chuck shaft forward of the machine, such control of the axial wind cam drum being effected as through a gear 260 thereon in mesh with a gear 261 on the main driving shaft 159. Said gear 261 is controlled by another solenoid-operated roll clutch 448 which is arranged to periodically turn the gear 261 two full revolutions. By making the gears in 4:1 ratio said drum 234 will be rotated one-half revolution for each two revolutions of the gear 261 on the main driving shaft. The rotation of drum 234 will, through the cam groove 236 and roller 235 engaged therein, effect reciprocation of housing 237 and thus the main chuck shaft 23.

Cancelling device

In the case of winding certain armatures as for example those with an odd number of turns of the coils, it becomes necessary to cancel or skip a roll-over movement or movements in order to restore the machine to the same starting position for each successive armature. One convenient way of accomplishing this is through release of the lock on shaft 223 and causing one-quarter revolution of the ejection cam 220 whereupon said shaft 223 will be shifted axially through the parts 222, 227, and 225 as best shown in Fig. 19 to disengage gear 252 on said shaft from rack 248. With gear 252 thus disengaged the roll-over cam drum 245 may be rotated and the rack 248 reciprocated to restore the same to a desired position without causing corresponding roll-over of the shaft 23. The cam and switch mechanism for accomplishing such cancelling steps are described in detail under the heading "Timing and Sequence Control Unit."

Binding device (Figs. 49 and 50)

This device is in the form of arm 262 pivoted to the base of the machine in front of the winding head 12 provided with an eye 263 having pins 264 projecting therefrom through another arm 265 pivotally connected to said arm 262 and provided with an eye 266. A spring 267 compressed between said arms separates said arms and thus causes a rubber band B adapted to be stretched over pins 264 to be stripped from the pins by the eye 266 upon release of the clip 268 which normally holds said arms together as shown.

In the position of this device as shown in Fig. 49 in full lines, the eyes 263 and 266 will be coaxial with the armature being wound and the clip 268 will be in position to be shifted to release the arms as aforesaid by movement of one of the wire feed fingers 25. Shifting of the device to an inoperative loading position as shown in dotted lines is effected through a double acting piston and cylinder assemblage and associated solenoid operated valve 269. In such dotted position the clip 268 may be re-engaged to hold said arms together and the operator can place another rubber band B over the pins 264.

The preferred sequence of operation is to shift said binding device to operating position just before the last axial wind operation whereby the wound armature will then pass through the eyes 263 and 266. After the laminated core portion of the armature has passed through said eyes, the clip 268 is actuated by the next feed finger movement to permit movement of the arms 262 and 265 by spring 267 and consequent stripping of a rubber band B from the pins 264. As apparent, the rubber band B will hold the wires last laid into the armature slots in place. The binding device remains in this position until after the new armature passes through the eyes thereof and at this time the assemblage 269 is actuated to shift the arms to the inoperative position whereat the operator of the machine may re-engage clip 268 and load a new rubber band B on pins 264.

Timing and Sequence control unit (Figs. 31, 32 and 33)

Having thus described the construction of the machine as a whole with respect to the basic elements thereon which produce the required movements of an armature to completely wind coils of wire thereonto, reference will now be made to the timing and sequence control device 14 which is shown in Fig. 1 as mounted at the rear portion of the base 8. It is to be noted that the main driving shaft 159 which rotates continuously during the operation of the machine leads into said device 14 for actuating the same.

Said device 14 may be of any of a variety of familiar and conventional forms and does not therefore require detail illustration herein other than the schematic diagrams of Figs. 31–33 nor is further detail description required other than to indicate that the same may for example comprise a rotary cam drum consisting of a series of twelve cam disks 270 to 281 keyed onto a common shaft 282 with each said disk including cam surfaces thereon effecting desired sequential actuation of switches 283 to 294, respectively associated with said disks for predetermined time intervals. Said switches will, of course, be arranged to energize the solenoids of the several roll clutches 441 to 448 and of the valves 120, 124, 218 and 269 for controlling supply of fluid under pressure to the fluid power devices 116 and 217 and to the cylinders 123 and 269.

Referring now more specifically to Figs. 31-33 there are twelve switches numbered 283 to 294 and operated in the following order by suitable cams such as the cam disks 270 to 281 aforesaid.

In the typical timing and sequence diagram illustrated in Fig. 32, which is slightly different from that outlined in Figs. 34 to 46, the cycle of operations is shown beginning with the winding operation, the feed fingers 25 then being in a radial outward position, the gripping and cutting unit 26 being disposed forward of the plane of the fingers 25 as shown in Fig. 35, and the armature to be wound being gripped in the collet 210 of main chuck shaft 23. Said collet 210 is closed by the closing of switch 288 by cam disk 275 and the consequent energization of solenoid valve 218 for device 217. The main driving shaft 159 is driven at a rate of 96 R. P. M. and thus the ratchet or like mechanism (not shown) within the timing device 14 should provide a desired ratio between the main driving shaft 159 and the shaft 282 of the cam drum therein so that for example, the cam drum shaft 282 will make one revolution during one complete cycle of operations of the machine.

In Figs. 32 and 33 the letters "R" and "L" denote right and left axial movements of the armature being wound as viewed in Fig. 1 or Figs. 34–45, for example, and the letters "CW" and "CCW" denote clockwise and counter-clockwise rotation of the armature as viewed from the front of the machine, viz. the left end of Fig. 1.

During the first two revolutions of the drive shaft 159 the ejection cam drum 220 is rotated one-half revolution by the closing of switch 283 by cam disk 270 and consequent engagement of solenoid-operated roll clutch 446. Said cam disk 270 will, of course, only close switch 283 long enough to permit two revolutions of the driven section of roll clutch 446 whereby two revolutions of gear 243 will turn gear 242 and cam drum 220 one-half revolution.

After the main chuck shaft 23 has thus been moved toward the rear of the machine to the position in Fig. 36, the feed fingers 25 are lowered or moved radially inward as in Fig. 36 by the closing of switch 284 by cam disk 271 for a time period only long enough to engage the solenoid-operated roll clutch 444 for one-quarter revolution. This is accomplished by providing four stop lugs 57 on said roll clutch and withdrawing the latch 58 only long enough to permit one lug to pass, and returning said latch for engagement by the next lug. Inward movement of said fingers as aforesaid places the wires W into the slots of sections 190 and 192 or the slots of sections 206 and 208, as the case may be, of the gripping and cutting unit 26. In Fig. 32 the lowering of the fingers occurs at "A."

The roll-over cam drum 245 is then rotated one-quarter revolution by the momentary closing of switch 285 by cam disk 272 and consequent energization of the solenoid-operated roll clutch 447 which is provided with one stop lug 57 whereby one revolution of the driven section will, through gearing 256 and 257, effect desired rotation of drum 245. This step in the operation of the machine rotates the main chuck shaft 23 180° and thus laces the wire W together as shown in Fig. 37.

The axial wind cam drum 234 is then rotated one-half revolution by momentary closing of switch 286 by cam disk 273 whereupon to energize the solenoid-operated roll clutch 448 to thus shift the armature axially toward the right to the position in Fig. 38 and thus cause the fingers to pass through the armature slots to lay the wires W thereinto.

Next, the switch 285 is again momentarily closed by cam disk 272 to energize the solenoid operated roll clutch 447 to cause the roll-over cam drum to rotate another one-quarter revolution and thereby roll over the armature 180° in a counterclockwise direction as viewed from the front of the machine. In the present example the first roll-over was 180° in a clockwise direction and the second roll-over counterclockwise. The parts of the machine are now in the position shown in Fig. 39.

Next, the axial wind cam drum 234 and roll-over cam drum 245 are successively actuated by the momentary closing of the respective switches 286 and 285 by cam disks 273 and 272 to repeat the axial winding and roll-over of the armature as often as required. These axial winding and roll-over operations are terminated with the parts positioned as in Fig. 41.

After the last axial wind operation the finger cam 177 is again actuated by the momentary closing of the switch 284 to effect raising or radial outward movement of the fingers 25 by another quarter revolution of the driven section of roll clutch 444. In Fig. 32 this occurs at "B."

In the event that the armatures are being wound with an odd number of turns, the next step is to operate the cancelling device which will preferably be incorporated in the cams 270 and 272 whereby the ejection cam drum 220 will be first rotated one-quarter revolution through its roll clutch 446 and through the cam follower 222, slide 227 and roller 225 (Fig. 17) effect axial shifting of the shaft 223 to disengage gear 252 thereon from rack 248 and then the roll-over cam drum 245 will be rotated any desired amount through its roll clutch 447 and through cam follower 247 on said rack (Fig. 21) effect transverse shifting of the latter to its starting position.

Furthermore, if a binding device is employed such as illustrated in Figs. 49 and 50 the same will be shifted to operative position prior to the last axial wind step by the closing of switch 291 by cam 278 thus energizing solenoid operated assemblage 269. In such position the last axial wind step will cause the armature to be projected through the eyes 263 and 266 of said device. Then after the last axial wind operation, the actuation of the finger cam 177 as aforesaid to raise the fingers 25 will release the clip 268 to thus strip a rubber band from the pins 264 for binding the ends of the armature coils.

Next, the ejection cam 220 is again actuated by the momentary closing of switch 283 by cam 270 to cause the armature to be moved to its starting position as at the left-hand side of Fig. 32 or as shown in Fig. 42.

The aforesaid operations constitute the winding operations and are noted in Fig. 32 as requiring 15.87 seconds or in other words 25.4 revolutions of the main drive shaft 159 in order to wind armatures with coils consisting of four turns of two conductors. Obviously the speed of the main driving shaft may be varied at will to correspondingly increase or decrease the productive capacity of the machine.

At this point of the operations the wires W in the gripping and cutting unit 26 are released by the opening of said unit as effected by the momentary closing of switch 287 by cam disk 274 and consequent energization of the solenoid-operated roll clutch 445 to turn eccentric 203 one-half revolution to thus move lever 201 in a direction to cause alignment of slots in sections 190, 191, and 192 (or sections 206, 207, and 208) of unit 26 permitting release of wires W gripped between sections 191 and 192 (or sections 207 and 208). Also at this point the grip on the armature shaft is released by the opening of switch 288 by cam disk 275 which switch up to this point has been constantly closed to hold collet 210 contracted upon the armature shaft whereupon pressure in the power device 217 is now released or reversed depending upon the form of solenoid valve 218 employed to allow the collet 210 to open. In Fig. 32 the opening of unit 26 and collet 210 occurs at "C."

Next, the loading ram 21 is moved toward the armature by the closing of switch 289 by cam disk 276 and resulting energization of the solenoid-operated roll clutch 442.

The cam disk 276 and roll clutch 442 are of form such that the loading ram is moved forward its entire stroke and is retracted only part way to the position of Fig. 43.

At the end of the forward movement of the loading ram 21 toward the armature, the collet 110 therein is closed upon the armature shaft by the closing of switch 290 by cam disk 277 and consequent operation of a solenoid-operated valve 120 for admitting fluid under pressure into the fluid power device 116. As before indicated, the loading ram 21 retracts only part way drawing the armature therewith and withdrawing the released wires W from the now open gripping and cutting unit 26 as shown in Fig. 43. Closing of collet 110 occurs at "D" in Fig. 32 and stopping of partial retraction of ram 21 occurs at "F."

At this stage of the operations the feed fingers 25 are again lowered by again closing the switch 284 by cam disk 271 whereby the outer wires W last laid into the armature slots are positioned within the yet aligned slots of the sections 190, 191, and 192 (or sections 206, 207, and 208) of gripping and cutting unit 26 as in Fig. 44. The lowering of the fingers as aforesaid occurs at "E" in Fig. 32 during partial retraction of ram 21.

Next, the switch 287 is again closed by cam disk 274 to rock the lever 201 through eccentric 203 in a direction to close the gripping and cutting unit 26 and thereby grip therein the wires W which lead to the feed fingers 25 and cut the wires W which lead to the armature. In Fig. 32, cutting and gripping of the wires occurs at "G."

Thereafter the loading ram 21 is actuated by the closing of switch 289 by cam disk 276 to further retract the loading ram and armature toward the front of the machine and away from the unit 26 to the position of Fig. 45 wherein the armature is free and during such movement the switch 290 controlling valve 120 of fluid power device 116 is opened by cam disk 277 whereby the pressure in said device is released or reversed to allow collet 110 to open whereupon bar 94 engages the end of the armature shaft, thus ejecting the latter from collet 110 and leaving the wound armature on the parallel rotating rollers 20. The rotation of rollers 20 is preferably continuous. In Fig. 32, the retraction of ram 21 and opening of collet 110 occurs at "I" and "J" respectively, the feed fingers 25 being again raised at "H."

Figure 46:
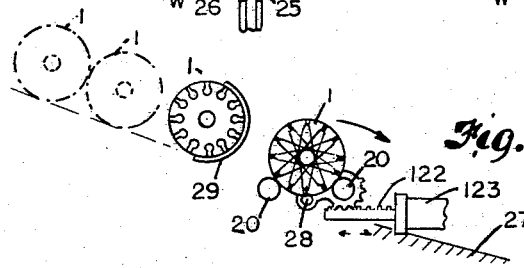

With the armature thus deposited on the rollers 20 and loading ram 21 retracted to home position, the kick-out pin 28 is actuated by the closing of switch 293 by cam disk 280 and resulting operation of solenoid-operated valve 124 for actuating cylinder 123. After the kick-out pin 28 has been moved upwardly and around one roller 20 to deposit the wound armature onto the discharge chute 27 the switch 293 is then opened to deenergize the solenoid valve 124 and thereby cause fluid under pressure to be directed into the other end of cylinder 123 to return the kick-out pin 28 to its inactive, lowered position between the rollers 20 as shown in Fig. 46.

After the wound armature has been thus kicked off onto the discharge chute 27, the bucket 29 is actuated by the momentary closing of the switch 292 by cam disk 279 which energizes the solenoid-operated roll clutch 441 to rotate the bucket one full revolution to pick up a new armature from the loading chute 90 (see Fig. 3) and drop the same between the rotating parallel rollers 20 as in Fig. 34. The unloading of the wound armature and loading of an armature core to be wound occurs between "K" and "L" in Fig. 32.

Next, the loading ram 21 is again actuated by the closing of the switch 289 by cam disk 276, this time to permit one full revolution of the solenoid-operated roll clutch 442 to thus move the new armature into the main shaft collet 210 in predetermined rotative position as determined by the slot indicator 24 in Fig. 35 or 103 in other figures. The actuation of ram 21 to position the armature core in collet 210 occurs between "L" and "M" in Fig. 32. With the new armature thus positioned within the main shaft collet 210, said collet is closed by the closing of the switch 288 by cam disk 275 which actuates the solenoid-operated valve 218 in circuit with the fluid power device 217. The closing of collet 210 occurs at "N" in Fig. 32. The new armature now is in position ready for the repeat cycle as indicated in Fig. 32.

As shown at the right portion of Fig. 32, the aforesaid loading and unloading operation takes about 7.25 seconds or 11.6 revolutions of the main driving shafts 159 and 40, but as previously indicated such cycle may be varied at will by changing the speed of the main drive. With the particular machine illustrated, an armature of the character indicated is kicked off from the machine every 23.12 seconds or at the rate of nearly three armatures per minute. Depending upon the design of the armature, the production of the machine may be increased or decreased, the aforesaid figures being merely exemplary and not restrictive in any sense.

The binding device will be shifted to its inoperative position (shown dotted in Fig. 49) by actuation of assemblage 269 by actuation of switch 291 by cam 278, whereat the operator can re-set the clip 268 and install a new rubber band over the pins 264. Then prior to the last axial wind operation the device will again be shifted to operative position.

As shown in Fig. 33, there is some overlap between the axial wind and roll-over operations whereby during the right stroke of the armature the roll-over begins very shortly after the end of the slotted armature body 3 passes the feed fingers 25 and similarly on the left stroke of the armature the roll-ever occurs while the armature is being moved axially. This assures compact winding and smooth interlacing or interweaving of the coils as well as shortening of the winding cycle and a more uniform speed of travel of the wires W through the feeding fingers 25 corresponding generally with the rate of drawing of wires from reels 146 by capstans 153. In this connection, the capstans 153 are continuously driven but as in wire draw benches, wire will only be drawn from supply reels 146 when tension is applied by the axial wind, roll-over, and ejection operations. It is further to be noted from Fig. 32 that other operations occur more or less simultaneously so that the loading and unloading operations are accomplished within a minimum time period.

*Distributed windings (Figs. 47 and 48)*

The foregoing description of the construction and operation of the machine was concerned with the winding of armature coils into diametrically opposite slots but as will hereinafter appear the windings may be disposed otherwise.

For example, as shown in Fig. 47, each coil 300 may be of the distributed vertical V-type in which the portion 301 is laid into one slot of the armature core, the portion 302 at one end of the armature passes one side of the armature shaft to a diametrically opposite slot, the portion 303 passes through such diametrically opposite slot, the portion 304 at the other end of the armature passes the other side of the shaft to a slot next adjacent the slot through which the portion 301 passes, the portion 305 passes through such adjacent slot, the portion 306 at such one end of the armature passes the side of the shaft opposite to portion 302, the portion 307 passes through the same slot as portion 303, the portion 308 at such other end of the armature passes the side of the shaft opposite to portion 304, and the portions 309, 310, and 311 are the same as the portions 301, 302, and 303, such winding being continued until the coil has the desired number of turns.

Distributed winding as aforesaid is readily accomplished by rendering the roll-over cam drum control mechanism operative to first roll over the shaft 23 180° in one direction, less than 180° in the same direction, less than 180° in the opposite direction, and 180° in such opposite direction, and repeating such roll-over steps as often as required.

In addition to the aforesaid method of distributed winding it is feasible in some instances to skip one or more slots between the portion 305 and the portions 301 and 309.

As a still further modification the winding may be distributed as illustrated in Fig. 48 in which each coil has portions 312, 313, and 314 in one slot of the armature and portions 315, 316, and 317 in three successive slots starting with a slot diametrically opposite the slot in which the portions 312, 313, and 314 are disposed. Here again the roll-over cam drum control mechanism will have to be modified to secure this pattern of winding.

It has been found that in some armatures distributed windings have certain advantages such as increased efficiency by reason of shorter copper and thus reduced $I^2R$ loss. Moreover, the shape and size of end build-up of the coils can be controlled, by varying the type of winding. For example, winding as in Figs. 35–46 forms ends of rounded or hyperbolic form whereas winding as in Figs. 47 and 48 forms ends of a more square or blunt form and shorter in a direction axially of the armature.

Other modes of applying the principle of the invention may be employed, change being made as regards the details described, provided the features stated in any of the following claims, or the equivalent of such, be employed.

I therefore particularly point out and distinctly claim as my invention:

1. In an armature winding apparatus designed to releasably grip one end of an armature for alternate reciprocation and part-turn rotation in a winding mechanism, the combination of an armature loading mechanism which comprises an armature support, a reciprocable loading ram adapted to engage the other end of the armature to move the latter along said support toward the winding mechanism to position such one end for gripping as aforesaid, a chuck in said loading ram and actuating means therefor operative to close said chuck to grip such other end of the armature upon completion of the winding of the armature and thus retract the wound armature from the winding mechanism responsive to retraction of said ram, means interrupting retraction of said ram, and thus the armature, for a predetermined period to permit severing of wires extending axially from such other end of the armature to the winding mechanism, said actuating means being further operative to open said chuck, and thus to release the wound armature onto said support, prior to completion of the retraction of said ram.

2. The structure according to claim 1 further characterized in that said armature support includes a rotating member frictionally engaging the armature to induce rotation thereof on said support and that a slot indicator is provided to engage in one of the armature slots during movement of the rotating armature toward the winding mechanism to predeterminedly position the armature with respect to the winding mechanism.

3. The structure according to claim 1 further characterized in that an armature discharge chute is positioned alongside said support, that a transversely movable kick-out member is provided on said support operative to engage a wound armature and transversely move the same from said support onto said discharge chute, and that means are provided for so moving said kick-out member responsive to release of a wound armature on said support.

4. The structure according to claim 1 further characterized in that an inclined armature supply chute is positioned alongside said support, that a rotary bucket in the form of a semicylindrical shell is disposed alongside said support and the lower end of said inclined chute adapted when rotated from a position with its outer semicylindrical surface facing said chute to a position with its inner semicylindrical surface facing said chute to allow an armature to gravitate into said bucket and when further rotated to a position with its inner semicylindrical surface facing said support, the armature is deposited on the latter, and that means are provided to intermittently rotate said bucket to the positions aforesaid.

5. The structure according to claim 4 further characterized in that an armature discharge chute is positioned on the other side of said support, and that a movable kick-out member is provided on said support adapted to engage a wound armature and move the same from said support onto said discharge chute.

6. In an armature winding apparatus designed to wind armatures by alternate reciprocation and part-turn rotation thereof in the apparatus, the combination of a winding head, radially positioned wire feed fingers reciprocable radially inward and outward of said head, a cam follower on each finger, a rotatable member in said head formed with a cam groove engaged with said followers, such groove being of a form such that rotation of said member in part-turn increments alternately moves said fingers inward and outward.

7. In an armature winding apparatus, the combination of a carrier, a plurality of wire supply reels rotatable in said carrier, power-driven capstans adjacent said reels around which capstans the wire from said reels is adapted to be wrapped, said capstans being operative to unwind wire from said reels and to feed the wire for winding an armature responsive to exertion of pulling force on the wire after it passes around said capstans, a winding head adjacent said capstans, and radially positioned wire feed fingers in said head formed with passages therethrough for wire leading from said reels and capstans, said fingers being disposed to have their inner ends alternately pass lengthwise and in alignment with the slots and across the ends of an armature to be wound in response to alternate reciprocation and part-turn rotation of the armature.

8. In an armature winding apparatus, the combination of an annular carrier, a plurality of wire supply reels rotatable in said carrier, power-driven capstans adjacent said reels around which capstans the wire from said reels is adapted to be wrapped, said capstans being operative to unwind wire from said reels and to feed the wire for winding an armature responsive to exertion of pulling force on the wire after it passes around said capstans, a winding head adjacent said capstans, and radially positioned wire feed fingers in said head formed with passages therethrough for wire leading from said reels and capstans, said fingers being disposed to have their inner ends alternately pass lengthwise and in alignment with the slots and across the ends of an armature to be wound in response to alternate reciprocation and part-turn rotation of the armature, said carrier being mounted for rotation whereby to render said reels readily accessible for replacement.

9. In an armature winding apparatus designed to wind a slotted armature by alternate reciprocation and part-turn rotation of the armature, the combination of radially positioned wire feed fingers adapted to pass through the slots and across the ends of an armature being wound upon reciprocation and rotation of the armature as aforesaid, a main chuck shaft adapted to releasably grip an armature therein, a wire gripping and cutting unit on said shaft adapted to grip wires leading from said feed fingers, a base supporting said shaft for reciprocation and rotation, a first member engaged with said shaft operative to reciprocate said shaft to a position with said fingers disposed on one side of said unit and the armature and to a position with said fingers disposed between said unit and the armature, a second member engaged with said shaft operative to reciprocate said shaft to a position with said fingers disposed between said unit and the armature and to a position with said fingers disposed on the other side of said unit and the armature whereby to cause the fingers to pass through the armature slots and thus lay wires into the slots, a third member engaged with said shaft operative to rotate said shaft and thus the armature adapted to be gripped therein, and means controlling said members whereby said shaft is first moved by said first member to position said fingers between said unit and the armature, and then alternately reciprocated and rotated by said second and third members whereby to cause wires to be wound into coils into the armature slots and across the opposite ends of the armature.

10. In an armature winding machine, the combination of a base, a power driving unit on said base, a main drive shaft adapted to be continuously rotated by said driving unit, wire feed fingers radially positioned with respect to a common axis through which wires to be coiled into armature slots and across the ends of the armatures is adapted to be fed, means supporting said fingers for radial inward and radial outward movement, a main chuck shaft adapted to releasably grip an armature therein, a wire gripping and cutting unit on said chuck shaft comprising relatively rotatable members having wire receiving slots and cooperating cutting edges, said unit being arranged to be opened by relative rotation of said members to align such slots and thus to release the wires leading thereto from said fingers and to be closed by relative rotation of said members to misalign such slots and thus to cut wires therein and to grip adjacent portions of the cut wires, means supporting said chuck shaft and thus the armature adapted to be gripped therein for reciprocation and rotation along and about such common axis, plural cams engaged with said fingers, unit and shaft operative to alternately move said fingers radially inward and outward, to alternately open and close said unit, and to alternately reciprocate and rotate said shaft, electrically operated clutches on said drive shaft controlling said cams and the respective fingers, unit, and shaft engaged thereby, and a timing and sequence control device driven from said drive shaft and electrically connected with said clutches whereby to actuate the latter in desired sequence and for predetermined time intervals.

11. In an armature winding apparatus designed to wind armatures by alternate reciprocation and part-turn rotation in a winding mechanism, the combination of a binding device disposed adjacent to the winding mechanism and through which the armature is adapted to pass upon withdrawal from the winding mechanism, said binding device being operative to release a retaining band around the wound armature to thus retain the wires in the slots thereof, and means for operating said device.

12. In an armature winding apparatus designed to wind armatures by alternate reciprocation and part-turn rotation in a winding mechanism, the combination of a binding device disposed adjacent to the winding mechanism and through which the armature is adapted to pass upon withdrawal from the winding mechanism, said binding device being operative to release a retaining band around the wound armature to thus retain the wires in the slots thereof, and means for operating said device, said device comprising a pair of members each including a ring through which the armature passes, one of said members carrying the retaining band, and the other of said members being mounted for movement relative to said one member to thus release the retaining band therefrom, a clip for holding said members in predetermined position and actuatable to release said members for relative movement as aforesaid, means for causing such relative movement of said members upon actuation of said clip, and means for actuating said clip.

13. In an armature winding apparatus designed to wind armatures so that the wire coils pass through the armature slots and across the opposite ends of the armature, the combination of a wire gripping and cutting unit comprising adjacent relatively rotatable members formed with wire-receiving slots and with cooperating cutting edges, and an actuating means and control therefor for relatively rotating said members first to a position aligning the slots therein for receiving one end of the wires therein and then to a position misaligning the slots therein to grip such one end of the wires so that the latter may be formed into coils passing through the armature slots and across the opposite ends of the armature, said actuating means and control therefor being further operative at the conclusion of the winding operation to relatively rotate said members to a position aligning the slots therein to release such one end of the wires for withdrawal from said unit and to receive the other end of the wires and then to a position misaligning the slots therein, said cooperating cutting edges being disposed, upon relative rotation of said members to a position misaligning the slots therein, to sever such other end of the wires while the adjacent portion of the wires in the slots are gripped preparatory to winding another armature.

14. The armature winding apparatus according to claim 13 characterized further in that one of said members has wire-receiving slots of less depth than the wires adapted to be received therein, and another of said members has wire-receiving slots including cam surfaces disposed to clamp the wires in the slots of said one member upon relative rotation of said members to a position whereat the slots thereof are misaligned.

15. The armature winding apparatus according to claim 13 characterized further in that portions of the slots of said members form a clearance therebetween so that in relatively rotating said members to a position misaligning the slots therein, adjacent portions of the wires are bent to laterally offset position and thus gripped.

16. A feed finger for an automatic armature winding apparatus of the character in which the feed finger alternately passes through the slots of an armature being wound and across the ends of the armature and feeds a wire into the slots of the armature, comprising a body having a portion thereof externally formed substantially to a point to engage and realign said slots upon entrance therein, and internally formed with a passage therethrough having smoothly contoured opposed walls flared longitudinally and terminating in an opening of narrow oblong cross section having its longitudinal axis aligned with said slot, for guiding said wires into said slots.

17. A feed finger for an automatic armature winding apparatus of the character in which the feed finger alternately passes through the slots of an armature being wound and across the ends of the armature and feeds a wire into the slots of the armature, comprising an elongated body adapted at one end to pass through said slot and having a portion thereof adjacent said end externally formed substantially to a narrow pointed wedge shape to engage and realign said slot upon entrance therein, said body being internally formed with a passage therethrough having smoothly contoured opposed walls flared longitudinally and terminating in an opening of narrow oblong cross section with the longitudinal axis thereof aligned with said slot for guiding said wire into said slot.

18. A feed finger for an automatic armature winding apparatus of the character in which the feed finger alternately passes through the slots of an armature being wound and across the ends of the armature and feeds a plurality of insulated wires into the slots of the armature comprising an elongated body adapted at one end to pass through said slot and having a portion thereof adjacent said end externally formed substantially to a narrow pointed wedge shape to engage and realign said slot on entrance therein, said body being internally formed with a passage therethrough having smoothly contoured opposed walls flared longitudinally and terminating in an opening of narrow oblong cross section with the longitudinal axis thereof in alignment with said slot for guiding said insulated wires into said slot without chipping said insulation.

References Cited in the file of this patent

UNITED STATES PATENTS

| Number | Name | Date |
| --- | --- | --- |
| 1,240,448 | Hensley | Sept. 18, 1917 |
| 1,292,551 | Wilson | Jan. 28, 1919 |
| 1,338,093 | Pearson | Apr. 27, 1920 |
| 1,353,269 | Rhoades | Sept. 21, 1920 |
| 1,489,199 | Dreaper | Apr. 1, 1924 |
| 1,661,331 | Gomory | Mar. 6, 1928 |
| 2,304,520 | Wirtz et al. | Dec. 8, 1942 |
| 2,345,816 | Hays | Apr. 4, 1944 |
| 2,348,948 | Allen | May 16, 1944 |
| 2,381,750 | Hunsdorf | Aug. 7, 1945 |
| 2,483,760 | Duncan | Oct. 4, 1949 |
| 2,561,562 | Collins | July 24, 1951 |
| 2,579,585 | Klinksiek | Dec. 25, 1951 |